(12) United States Patent  (10) Patent No.: US 9,245,245 B2
Sherman et al.  (45) Date of Patent: Jan. 26, 2016

(54) MANAGING SEMANTIC DATA IN A CONTEXTUAL WORKSPACE

(75) Inventors: Yahali Sherman, Tel Aviv (IL); Vitaly Vainer, Kfar Saba (IL); Avi Guzansky, Petah Tiqwa (IL); Dmitry Khalatov, Yokneam (IL); Guy Bavly, Herzilia (IL); Pavel Kravets, Ashdod (IL); Ram Alon, Kfar Saba (IL); Ran Gross, Rosh-Haain (IL); Yoav Cohen, Rishon-le-zion (IL)

(73) Assignee: SAP Portals Israel Ltd, Ra'anana (IL)

( * ) Notice: Subject to any disclaimer, the term of this patent is extended or adjusted under 35 U.S.C. 154(b) by 1093 days.

(21) Appl. No.: 13/267,373

(22) Filed: Oct. 6, 2011

(65) Prior Publication Data

US 2013/0091456 A1  Apr. 11, 2013

(51) Int. Cl.
*G06Q 10/06* (2012.01)
*G06Q 10/10* (2012.01)

(52) U.S. Cl.
CPC ............... *G06Q 10/06* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 5,790,853 | A | 8/1998 | Nomura et al. |
| 6,101,506 | A | 8/2000 | Ukai et al. |
| 6,289,385 | B1 | 9/2001 | Whipple et al. |
| 8,448,089 | B2 | 5/2013 | Li et al. |
| 8,671,365 | B2 | 3/2014 | Berus |
| 8,892,658 | B2 | 11/2014 | Gupta et al. |
| 2001/0019338 | A1 | 9/2001 | Roth |
| 2002/0073146 | A1 | 6/2002 | Bauer et al. |
| 2005/0076095 | A1 | 4/2005 | Mathew et al. |
| 2005/0097008 | A1 | 5/2005 | Ehring et al. |
| 2006/0075355 | A1 | 4/2006 | Shiono et al. |
| 2006/0095276 | A1 | 5/2006 | Axelrod et al. |
| 2006/0212822 | A1 | 9/2006 | Facemire et al. |
| 2008/0244444 | A1* | 10/2008 | Bauman ............... G06F 9/4443 715/806 |
| 2008/0270919 | A1 | 10/2008 | Kulp et al. |
| 2009/0013043 | A1 | 1/2009 | Tan |
| 2009/0049372 | A1 | 2/2009 | Goldberg |
| 2009/0077473 | A1 | 3/2009 | Williams et al. |
| 2009/0089709 | A1 | 4/2009 | Baier et al. |
| 2009/0172519 | A1 | 7/2009 | Xu et al. |
| 2009/0187815 | A1* | 7/2009 | Becerra et al. ................. 715/212 |
| 2009/0189894 | A1 | 7/2009 | Petrov et al. |
| 2009/0222742 | A1 | 9/2009 | Pelton et al. |
| 2009/0307598 | A1 | 12/2009 | Giles |
| 2010/0042942 | A1 | 2/2010 | Vasilevsky et al. |
| 2010/0106546 | A1 | 4/2010 | Sproule |
| 2010/0131850 | A1 | 5/2010 | Berus |

(Continued)

OTHER PUBLICATIONS

Wikipedia, "iGoogle" http://en.wikipedia.org/wiki/IGoogle, May 5, 2011 (4 pages).

(Continued)

*Primary Examiner* — Thanh Vu
(74) *Attorney, Agent, or Firm* — Fish & Richardson P.C.

(57) ABSTRACT

Techniques for managing a virtual workspace include: generating a virtual workspace viewable by a user on a graphical user interface, the virtual workspace comprising a plurality of workspace modules comprising data contained in a plurality of data objects; identifying an interaction by the user with at least some of the data contained in a particular data object of the plurality of data objects; and providing, through the virtual workspace, at least one suggestion comprising a description of data contained in the plurality of data objects that is semantically related to the data interacted with by the user.

33 Claims, 13 Drawing Sheets

(56) References Cited

U.S. PATENT DOCUMENTS

| | | | |
|---|---|---|---|
| 2010/0138476 | A1 | 6/2010 | Gokaraju et al. |
| 2010/0162097 | A1 | 6/2010 | Dalvi et al. |
| 2010/0171740 | A1 | 7/2010 | Andersen et al. |
| 2010/0175031 | A1 | 7/2010 | Alton et al. |
| 2010/0235766 | A1 | 9/2010 | Fujioka |
| 2010/0306651 | A1 | 12/2010 | Quennesson et al. |
| 2011/0313850 | A1* | 12/2011 | Hahn et al. ............. 705/14.45 |
| 2012/0054639 | A1 | 3/2012 | Shi et al. |
| 2012/0198358 | A1 | 8/2012 | Carrer et al. |
| 2013/0036115 | A1 | 2/2013 | Schwarz et al. |

OTHER PUBLICATIONS

Wikipedia, "OLAP Cube" http://en.wikipedia.org/wiki/Olap_cube, May 17, 2011 (4 pages).

Stefania Ghita et al., "Semantically Rich Recommendations in Social Networks for Sharing, Exchanging and Ranking Semantic Context" L3S Research Center / University of Hanover, Hanover, Germany (15 pages).

Google Social Search, "Google Operating System" http://googlesystem.blogspot.com/2011/02/google-social-search-recommendation.html, May 5, 2011 (1 page).

"How Does the Amazon Recommendation Feature Work?" http://stackoverflow.com/questions/2323768/how-does-the-amazon-recommendation-feature-work, May 5, 2011 (4 pages).

"Use the Outlook Social Connector with Facebook, LinkedIn, MySpace and Windows Live!" http://blogs.office.com/b/microsoft-outlook/archive/2010/07/13/use-the-outlook-social-conn, May 5, 2011 (2 pages).

Office Action for U.S. Appl. No. 13/252,489 mailed Feb. 13, 2013; 16 pages.

Office Action for U.S. Appl. No. 13/252,549 mailed Apr. 12, 2013; 12 pages.

Office Action for U.S. Appl. No. 13/267,277 mailed Feb. 22, 2013; 30 pages.

Office Action for U.S. Appl. No. 13/252,489 mailed May 2, 2014; 15 pages.

Office Action for U.S. Appl. No. 13/252,489 mailed Jun. 20, 2013; 18 pages.

Office Action for U.S. Appl. No. 13/252,489 mailed Dec. 17, 2013; 17 pages.

Office Action for U.S. Appl. No. 13/252,549 mailed Jun. 20, 2014; 10 pages.

Office Action for U.S. Appl. No. 13/252,549 mailed Oct. 25, 2013; 18 pages.

Office Action for U.S. Appl. No. 13/252,549 mailed Dec. 20, 2013; 9 pages.

Office Action for U.S. Appl. No. 13/267,277 mailed Jan. 7, 2015; 33 pages.

Office Action for U.S. Appl. No. 13/267,277 mailed Jun. 19, 2014; 32 pages.

Office Action for U.S. Appl. No. 13/267,277 mailed Jul. 8, 2013; 31 pages.

\* cited by examiner

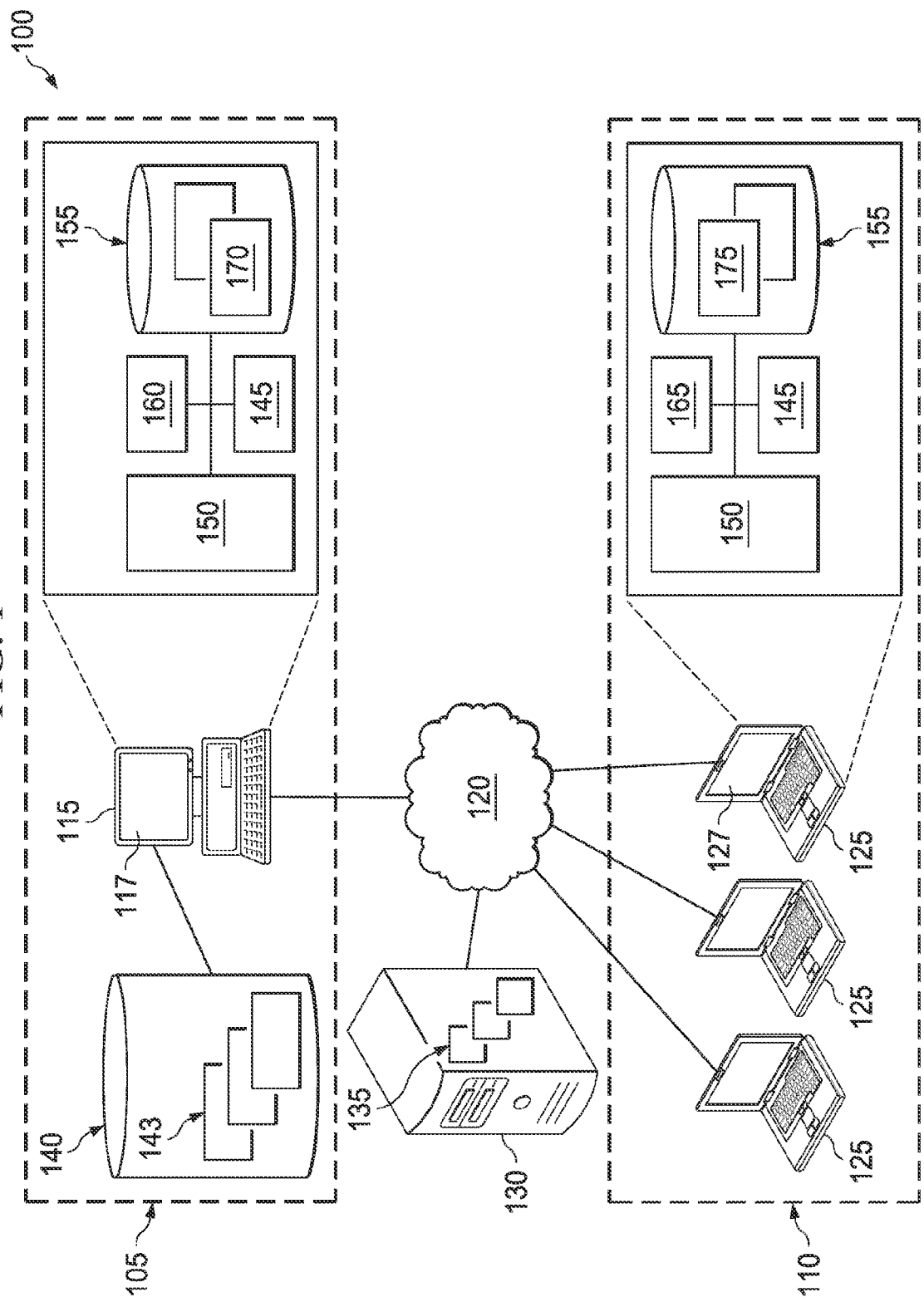

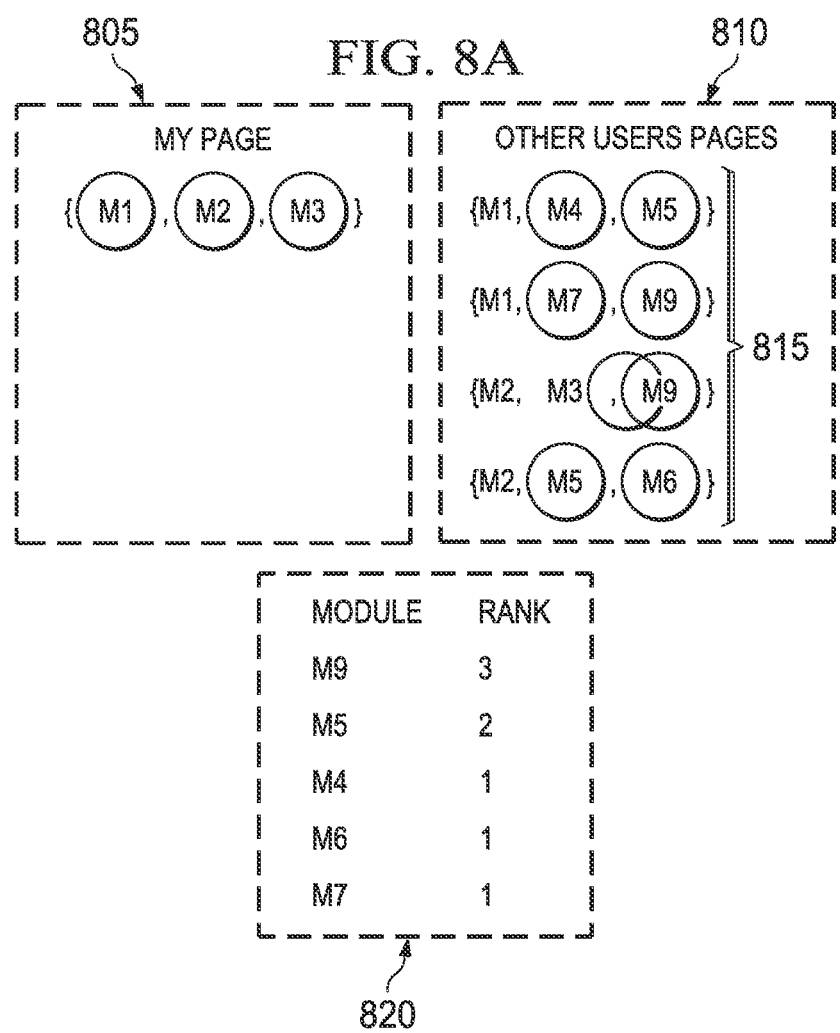

FIG. 8C

805 MY PAGE
{M1, M2, M3}

810 OTHER USERS PAGES — 815
{M1, M4, M5}
{M1, M7, M9}
{M2, M3, M9}
{M2, M5, M6}

Δ TIME OF ADDING TO PAGE
M1 → M4 30m
M1 → M5 1h
M1 → M7 1h
M1 → M9 2d
M2 → M9 3d
M3 → M9 3d
M2 → M5 14d
M2 → M6 10d

840

| MODULE | WEIGHT |
|---|---|
| M4 | 2 |
| M5 | 0 |
| M6 | 0 |
| M7 | 2 |
| M9 | 1 |

820

| MODULE | RANK |
|---|---|
| M9 | 3 |
| M5 | 2 |
| M4 | 1 |
| M6 | 1 |
| M7 | 1 |

845

| THRESHOLD | WEIGHT |
|---|---|
| <=1d | 2 |
| <=5d | 1 |
| >5d | 0 |

| MODULE | RANK |
|---|---|
| M9 | 4 |
| M7 | 3 |
| M4 | 3 |
| M5 | 2 |
| M6 | 1 |

MANAGING SEMANTIC DATA IN A CONTEXTUAL WORKSPACE

TECHNICAL BACKGROUND

This disclosure relates to using a contextual workspace to view, modify, and/or manage business data for a business enterprise.

BACKGROUND

Business users of software in a business enterprise may utilize a virtual workspace to browse, view, modify, and/or otherwise manipulate data related to the business enterprise. Such data may include a variety of information in many different forms, such as sales data, revenue data, human resources information, business hierarchy information, and otherwise. Graphs, tables, charts, electronic communications, web services, reports, and other forms of data, may be viewable in the user's workspace. The workspace may allow or facilitate the resolution of business issues and/or problems by the user. In some situations, however, the workspace itself has no semantic knowledge of the content being viewed and/or manipulated by the user. Thus, the workspace may not able to provide services to the user that rely on a semantic context of data (active or passive) in the workspace, i.e., one or more workspace modules that are on viewable and/or modifiable on the workspace at a given moment. Contextual information, however, may enable the user to identify relationships between existing modules active in the workspace, relationships between active modules and additional data related to the business enterprise, and, generally, enrich the workspace context.

In some instances, there may be relevant data that is unknown to the business user, such as, for example, additional applications, reports, data feeds, or simply raw data from different content providers. For instance, to react to some business event or to proceed with a business process, the user may need to add relevant content to the workspace to have additional insights or perform further actions. Finding the relevant content is a complex task as each content source offers a lot of content in different formats and protocols, which are not necessarily understood or exposed to the user. Moreover, searching each content provider or other sources of business data for the relevant content is not trivial, as search terms are often complex and content providers might not offer usable search mechanisms.

In some cases, relevant content that may assist the business user in a business event or business process may include content previously generated, viewed, and/or used by a business colleague (e.g., another business user in the same business unit, a different business unit, and/or with a similar role in the business enterprise). The business user, however, may have no way to leverage this internal knowledge about what other colleagues did in similar business situations.

Should such relevant content become available to the business user through the workspace, it can often be disjointed and unmanageable. For instance, certain relevant information may be more critical to the business user compared to other relevant information. For instance, relevant information that a colleague with a similar business role found to be important may be more critical than other information. Thus, as data is collected from various content providers, it may be culled and/or prioritized according to different criteria.

SUMMARY

The present disclosure describes one or more general embodiments for managing a virtual workspace including: generating a virtual workspace viewable by a user on a graphical user interface, the virtual workspace comprising a plurality of workspace modules comprising data contained in a plurality of data objects; identifying an interaction by the user with at least some of the data contained in a particular data object of the plurality of data objects; and providing, through the virtual workspace, at least one suggestion comprising a description of data contained in the plurality of data objects that is semantically related to the data interacted with by the user.

A first aspect combinable with any of the general embodiments may include receiving the suggestion from a content provider communicably coupled to the virtual workspace.

In a second aspect combinable with any of the general embodiments, identifying an interaction by the user with at least some of the data contained in the plurality of data objects comprises at least one of: identifying a workspace module added to the virtual workspace by the user; identifying a selection of a workspace module in the plurality of workspace modules; identifying a selection of the data contained in the particular data object; or identifying a metric of the particular data object among a plurality of metrics.

A third aspect combinable with any of the general embodiments may include identifying metadata associated with the data interacted with by the user.

A fourth aspect combinable with any of the general embodiments may include identifying the data contained in the plurality of data objects that is semantically related to the data interacted with by the user based on the identified metadata.

A fifth aspect combinable with any of the general embodiments may include generating a plurality of suggestions, each suggestion comprising a description of data contained in the plurality of data objects that is semantically related to the data interacted with by the user.

A first aspect combinable with any of the general embodiments may include ranking the plurality of identified suggestions based on a calculated relevancy of each of the plurality of identified suggestions.

In a sixth aspect combinable with any of the general embodiments, ranking the plurality of identified suggestions based on a calculated relevancy of each of the plurality of identified suggestions includes determining, for each data object, an occurrence frequency of at least one keyword from the metadata associated with the data interacted with by the user in the data contained in the plurality of data objects; and determining an order of the data objects based on the determined occurrence frequencies, wherein a data object having the highest occurrence frequency is at a top of the order and a data object having a lowest occurrence frequency is at a bottom of the order.

In a seventh aspect combinable with any of the general embodiments, the plurality of data objects include a first data object and a second data object.

An eighth aspect combinable with any of the general embodiments may include identifying at least one metric of the first data object.

A ninth aspect combinable with any of the general embodiments may include matching the identified metric to a metric of the second data object.

A tenth aspect combinable with any of the general embodiments may include generating the suggestion comprising a description of data contained in the second data object.

In an eleventh aspect combinable with any of the general embodiments, the plurality of data objects may include a plurality of data cubes.

In a twelfth aspect combinable with any of the general embodiments, identifying an interaction by the user with at least some of the data contained in a particular data object of the plurality of data objects may include identifying an interaction by the user with at least some of the data contained in a particular data cube of the plurality of data cubes.

A thirteenth aspect combinable with any of the general embodiments may include identifying at least one metric of the particular data cube interacted with by the user.

A fourteenth aspect combinable with any of the general embodiments may include searching the plurality of data cubes for another data cube having the identified metric of the particular data cube interacted with by the user.

A fifteenth aspect combinable with any of the general embodiments may include generating the suggestion comprising a description of data contained in the other data cube.

A sixteenth aspect combinable with any of the general embodiments may include querying the other data cube for at least one view of data contained in the other data cube that matches a view of data contained in at least one workspace module in the virtual workspace viewable in the graphical user interface.

A seventeenth aspect combinable with any of the general embodiments may include generating the suggestion comprising a description of the view of data contained in the other data cube.

An eighteenth aspect combinable with any of the general embodiments may include searching the plurality of data cubes for at least one report utilizing the view of data contained in the other data cube that matches a view of data contained in at least one workspace module.

A nineteenth aspect combinable with any of the general embodiments may include generating the suggestion comprising a description of the report utilizing the view of data contained in the other data cube.

Various embodiments of a contextual virtual workspace according to the present disclosure may have one or more of the following features. For example, the contextual workspace may add data content sources (e.g., workspace modules containing data from the content sources) to the workspace, thereby enabling a business user of the workspace to consume data from various sources. The contextual workspace may also apply the relevant workspace module on the workspace at runtime. Further, the contextual workspace may also provide for and/or add a semantic context to the workspace. The semantic context may be aware of all the modules on the workspace (e.g., which module was lately interacted with, which module is active, and otherwise) and enable collection of semantic information on each module (e.g., type, title, and content attributes as well as what operations were done by the user on each module). The contextual virtual workspace may be, therefore, 'smart" in that it may expose semantic content and enable contextual services (e.g., suggestions) based on the content. The contextual workspace may also identify context by combining known information on the contents of the workspace and the user interaction with this content to create a meaningful semantic context. The contextual workspace may thus focus on using content and/or user-related metadata (e.g., collected explicitly or implicitly in the user working environment) to find other relevant content. For example, the contextual workspace may search for content in concrete data and/or data relationships in different content providers (e.g., searching for a metric extracted from a report used by the user in his workspace and looking for data, such as OLAP data cubes or reports, that use the same metric in the some content provider). As another example, the contextual workspace may suggest workspace modules to add to the workspace according to, for instance, a user's last action, one or more combinations of the workspace similarity and other users behavior patterns, user similarity with other users, time proximity, and other factors. Thus, the contextual workspace may utilize social connections (e.g., role of a user in an enterprise, position of the user, organization unit of the user) to formulate a weight coefficient to apply to more data and/or suggestions Various embodiments of a contextual virtual workspace according to the present disclosure may also include one or more of the following features. For example, the contextual workspace may reflect and/or provide business data in real-time through one or more workspace modules that may be updated dynamically. In the present disclosure, the term "real-time" refers to a substantially instantaneous or near instantaneous event. In other words, "real-time" may refer to the concept of user-interaction time, i.e., the amount of processing time by or with the contextual virtual workspace is less than the user's reaction time (e.g., less than 0.5 seconds). The contextual workspace may also search and/or manipulate well modeled tables and cubes for semantic services (e.g., suggestions, simplified data acquisition); semantic services in our solutions occurs in time of user interaction (real time). For example, the contextual workspace may include and/or be coupled with a highly parallelized computational engine with computationally intensive UI patterns (e.g., real time alerts, suggestions). In some aspects, the contextual virtual workspace may be communicably coupled with an in-memory database that allows the user, through the workspace, to instantly (or near instantly) explore and analyze transactional and analytical data from virtually any data source in real-time. Operational data is captured in memory as business happens, and flexible views expose analytic information at the speed of thought. External data can be added to analytic models to expand analysis across an entire business enterprise. In other words, business logic may be closely coupled next to data.

Various embodiments of a contextual virtual workspace according to the present disclosure may also include one or more of the following features. For example, the contextual workspace may collect information about one or more active workspace modules and then recognize relevant content data according to, e.g., metadata, user-interface (UI or workspace module) content, such as headers of a table, activeness of the module, and other metrics. Thus the workspace may push suggestions to the user based on the recent tasks, such as a recent action taken that changes the content of his/her workspace. As another example, the contextual workspace may identify relevant content as the basis of suggestions in the form of a title of a module (e.g., a snapshot of business explorer description); metadata (e.g., names of columns or descriptions of columns of a table); a cube (e.g., measures and/or dimensions of an OLAP cube or other data structure allowing fast access of arrayed data, facet-filtering the cube by measure and/or dimension); reports (e.g., prompts/input fields); location of user's input device in workspace; and/or user selection of text in a particular workspace module.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 1 illustrates an example distributed computing system operable to generate, view, modify, and/or otherwise manipulate a contextual workspace according to the present disclosure;

FIGS. 8A-8C graphically illustrate an example algorithm implemented by a contextual workspace according to the present disclosure.

DETAILED DESCRIPTION

Figure 2A:
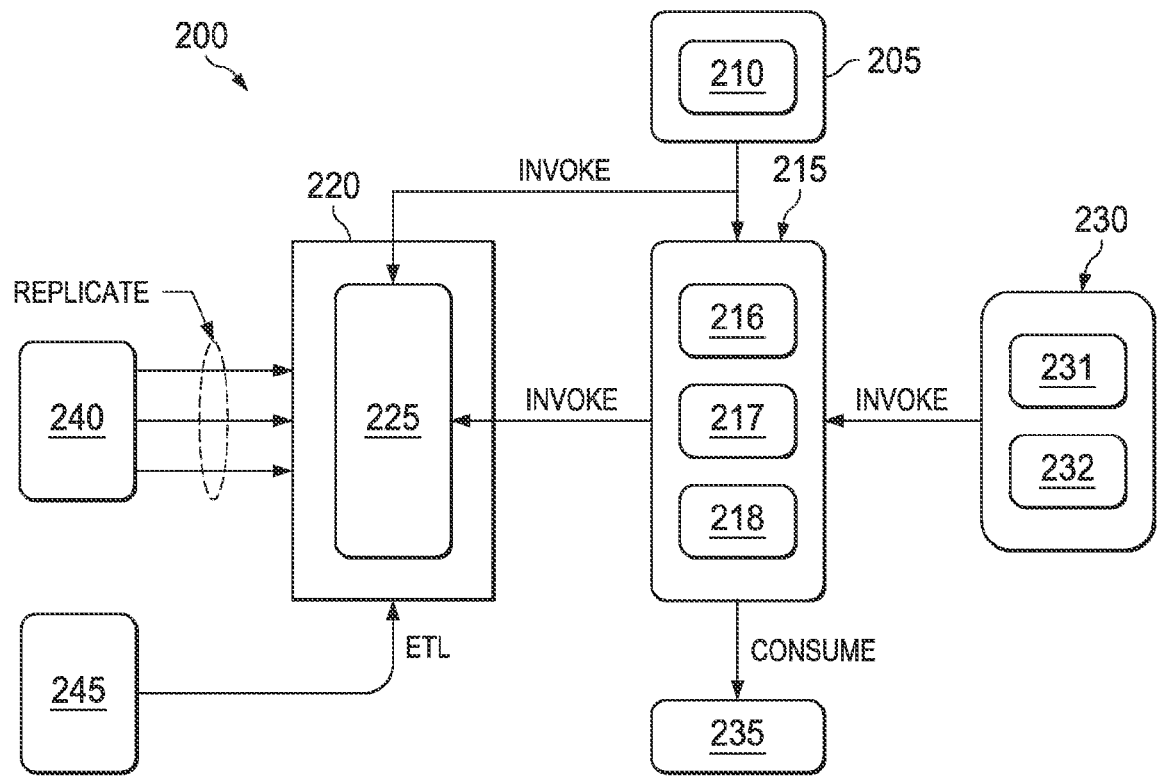
FIGS. 2A-2B illustrate additional example distributed computing systems operable to generate, view, modify, and/or otherwise manipulate a contextual workspace according to the present disclosure.

FIG. 1 illustrates an example distributed computing system 100 operable to generate, view, modify, and/or otherwise manipulate a contextual workspace. According to the present disclosure, a contextual workspace may be a virtual workspace viewable (e.g., through a graphical user interface of a particular computing device), modifiable, and or engageable by a user that presents business data connected or related according to one or a number of business contexts. As explained more fully below, the business data may be presented to the user in any of a variety of techniques and views, such as, for example, reports, tables, notes, graphs, and other views. The business data may be connected and/or related according to any of a variety of contexts, such as, for example, a particular business issue or problem, a particular product or service, a particular organizational unit and/or portion of a business enterprise, across a particular position and/or user role found within the business enterprise, and other contexts. Thus, the contextual workspace may help the user solve or attack a business problem, manage one or more products and/or services offered by the business enterprise, and/or take advantage of existing organizational and/or user relationships established across the enterprise.

In some embodiments, a "user role" may be a role of a user within his/her business enterprise as determined in the enterprise's corporate human resource (HR) system(s) and its affinity to groups and departments, and a role that may be a dynamically calculated business network relationship within the enterprise based on business solutions developed through one or more enterprise applications. It may include, but not be limited to, participation in particular projects, having particular expertise, participation in the same (e.g., ad hoc) working groups, and otherwise.

The illustrated computing environment 100 includes a server system 105, a client system 110, and a remote computing system 130 communicably coupled through a network 120. Although illustrated as single systems, each of the systems 105, 110, and 130 may include more than one system and/or more than one computing device (e.g., computer, laptop, server, mobile device, and otherwise) within a distributed computing environment. In general, computing environment 100 depicts an example configuration of a system capable of providing stateful execution of stateless applications in a substantially transparent way, as well as dynamically determining the particular application's mode of operation in response to requests from its clients (e.g., client appliances 125).

The illustrated server system 105 includes one or more server appliances 115 having corresponding graphical user interfaces (GUIs) 117. In general, the server appliance 115 is a server that stores one or more applications, where at least a portion of the applications are executed via requests and responses sent to users or clients within and communicably coupled to the illustrated environment 100 of FIG. 1. In some instances, the server appliance 115 may store a plurality of various hosted applications, while in other instances, the server appliance 115 may be a dedicated server meant to store and execute only a single hosted application (e.g., the contextual workspace (server) 160). In some instances, the server appliance 115 may comprise a web server, where the applications, such as the contextual workspace (server) 160 represent one or more web-based applications accessed and executed via network 120 by the client appliances 125 of the environment 100 to perform the programmed tasks or operations of the hosted applications.

At a high level, the server appliance 115 comprises an electronic computing device operable to receive, transmit, process, store, or manage data and information associated with the environment 100. Specifically, the server appliance 115 illustrated in FIG. 1 is responsible for receiving application requests from one or more applications (e.g., associated with the clients 125 of environment 100 and responding to the received requests by processing said requests in the associated hosted application 114, and sending the appropriate response from the hosted application 114 back to the requesting client application 144. In addition to requests from the external clients 125 illustrated in FIG. 1, requests associated with the hosted applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server appliance 115, environment 100 can be implemented using two or more server appliances 115, as well as computers other than servers, including a server pool. Indeed, server appliance 115 may be any computer or processing device such as, for example, a blade server, general-purpose personal computer (PC), Macintosh, workstation, UNIX-based workstation, or any other suitable device (e.g., smartphones, PDAs, tablets). In other words, the present disclosure contemplates computers other than general purpose computers, as well as computers without conventional operating systems. Further, illustrated server appliance 115 may be adapted to execute any operating system, including Linux, UNIX, Windows, Mac OS, or any other suitable operating system.

The illustrated server appliance 115 is communicably coupled with in-memory database 140 in the server system 105. In some embodiments, server 115 and/or certain of its components may be integrated with database 140 so that, for instance, processing (e.g., all or partial) may be performed directly on in-memory data with processing results passed (e.g., via a communication channel) directly to a client. In alternative embodiments, the in-memory database 140 may be located external to the server system 105 and communicably coupled to one or more of the server system 105 and/or client system 110 through the network 120. The illustrated in-memory database 140 may include integrated processing, i.e., all business and/or analytic operations done in processing memory. Moreover, content from business content sources (described more fully below) may be replicated from one or more transactional systems (e.g., coupled to the network 120) to the in-memory database 140 immediately. Thus, the in-memory database 140, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some embodiments, the in-memory database 140 may expose business data and capabilities to improve an end-solution for end users (e.g., the client appliances 125). The in-memory database 140 may reside on top of a computational engine (e.g., in the server appliance 115 or otherwise) that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

The illustrated in-memory database 140 stores one or more data objects 143. The data objects 143 may include and/or reference a variety of objects that store and/or include business data. For instance, the data objects 143 may be data cubes, such as OLAP (online analytical processing) cubes. The data cubes may consist of a data structure that allows for columnar data storage rather than, e.g., row data storage; different types of indices compared to relational databases; and in-memory technology as compared to data stored in relational databases. The data cube may also allow manipulation and/or analysis of the data stored in the cube from multiple perspectives, e.g., by dimensions, measures, and/or elements of the cube. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube may have three-dimensions, but any number of dimensions may be designed into the cube (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube. For instance, the data cube may be pivoted, in various ways. Each pivot provides the business user with a distinct view of particular business data stored in the cube. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube in real-time may allow the business user to more efficiently analyze the business data.

Other functions performable on data cubes may be, for instance, slice, dice, drill down/up, and roll-up. A slice operation identifies a subset of a multi-dimensional array corresponding to a single value for one or more members of the cube dimensions not in the subset. A dice operation is a slice operation on more than two dimensions of a data cube (or more than two consecutive slices). A drill down/up operation allows the business user to navigate the data cube's levels of data to reveal levels containing the most summarized (up) data to the most detailed (down) data. A roll-up operation involves computing all of the data relationships for one or more dimensions of the data cube.

The data objects 143 may include and/or store other forms of data along with or in place of data cubes. For example, the data objects 143 may represent, store, and/or reference data from one or more content sources, such as web content, feeds, REST services, business data repositories, reports, status updates, discussions, wikis, blogs, and other content sources. Of course, while illustrated as contained in the in-memory database 140, the data objects 143 may also be stored, for example, in one or both of the memories 155, in the remote computing system 130, and/or a separate repository communicably coupled to the network 120. In some embodiments, the data objects 143 may be stored in a raw, compiled, or compressed form or combination thereof.

The illustrated client system 110 includes one or more client appliances 125 having corresponding GUIs 127. Each client appliance 125 may be any computing device operable to connect to or communicate with at least the server system 105 and/or via the network 120 using a wireline or wireless connection. Further, as illustrated, each client appliance 125 includes a processor 150, an interface 145, and a memory 155. In general, each client appliance 125 comprises an electronic computer device operable to receive, transmit, process, and store any appropriate data associated with the environment 100 of FIG. 1. It will be understood that there may be any number of client appliances 125 associated with, or external to, environment 100. For example, while illustrated environment 100 illustrates three client appliances, alternative implementations of environment 100 may include a single client appliance 125 communicably coupled to the server system 105, or any other number suitable to the purposes of the environment 100.

Additionally, there may also be one or more additional client appliances 125 external to the illustrated portion of environment 100 that are capable of interacting with the environment 100 via the network 120. Further, the term "client" and "user" may be used interchangeably as appropriate without departing from the scope of this disclosure. Moreover, while each client appliance 125 is described in terms of being used by a single user, this disclosure contemplates that many users may use one computer, or that one user may use multiple computers. As used in this disclosure, client appliance 125 is intended to encompass a tablet computing device, personal computer, touch screen terminal, workstation, network computer, kiosk, wireless data port, smart phone, personal data assistant (PDA), one or more processors within these or other devices, or any other suitable processing device. For example, each client appliance 125 may comprise a computer that includes an input device, such as a keypad, touch screen, mouse, or other device that can accept user information, and an output device that conveys information associated with the operation of the server system 105 or the client appliance 125 itself, including digital data, visual information, any application, or the GUI 127. Both the input and output device may include fixed or removable storage media such as a magnetic storage media, CD-ROM, or other suitable media to both receive input from and provide output to users of the client appliances 125 through the display, namely, the GUI 127.

The illustrated network 120 facilitates wireless or wireline communications between the components of the environment 100 (i.e., between the server system 105 and the client system 110), as well as with any other local or remote computer (e.g., remote computing system 130), such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the client system 110 and the server system 105.

Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, subnetwork, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), cellular networks, all or a portion of the Internet, and/or any other communication system or systems at one or more locations.

The illustrated remote computing system 130 is communicably coupled to one or both of the server system 105 and client system 110 through the network 120. In some instances, as illustrated, the remote computing system 130 stores and/or references third party content 135, such as, for example, data objects, web content, electronic communications, content feeds, and other data sources. Although illustrated as a single appliance, the remote computing system 130 may include any number of appliances (e.g., servers, clients, mobile devices, and otherwise) coupled to the network 120 individually and/or in groups. For instance, in some embodiments, the remote computing system 130 may be a web content server delivering web content to one or more of the client appliances 125 in response to a request. In some embodiments, the remote computing system 130 may be a repository storing one or more data objects, such as data cubes or other form of database storing business data.

The illustrated communication interfaces 145 (shown as part of the server appliance 115 and the client appliance 125) facilitate communication among appliances in, for example, the client system 110, the remote computing system 130, and the server system 105. The interfaces 145 may also facilitate communication among the illustrated systems and other systems in a client-server or other distributed environment (including within environment 100) connected to the network. Generally, the interfaces 145 include logic encoded in software and/or hardware in a suitable combination and operable to communicate with the network 120. More specifically, the interfaces 145 may include software supporting one or more communication protocols associated with communications such that the network 120 or interface's hardware is operable to communicate physical signals within and outside of the illustrated environment 100.

The illustrated processors 150 (shown as part of the server appliance 115 and the client appliance 125) may be a central processing unit (CPU), a blade, an application specific integrated circuit (ASIC), a field-programmable gate array (FPGA), or another suitable component. Generally, the processors 150 execute instructions and manipulate data to perform the operations of the respective server appliance 115 and client appliance 125 and, specifically, the contextual workspace module (server) 160 and contextual workspace module (client) 165), as well as any other applications. Specifically, the server appliance's processor 150 executes the functionality required to receive and respond to requests from the client appliances 125 and their respective applications (e.g., contextual workspace (client) 165), as well as the functionality required to perform the other operations of the contextual workspace module (server) 160.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of submodules, third party services, components, libraries, and such, as appropriate. Conversely, the features and functionality of various components can be combined into single components as appropriate. Although illustrated as a single processor 150 for each of the respective server appliance 115 and client appliance 125 in FIG. 1, two or more processors may be used according to particular needs, desires, or particular embodiments of environment 100.

The illustrated memories 155 (shown as part of the server appliance 115 and the client appliance 125) may include any memory or database module and may take the form of volatile or non-volatile memory including, without limitation, magnetic media, optical media, random access memory (RAM), read-only memory (ROM), removable media, or any other suitable local or remote memory component. Each memory 155 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective server appliance 115 and client appliance 125. Additionally, each memory 155 may include any other appropriate data, such as VPN applications, firmware logs and policies, firewall policies, a security or access log, print or other reporting files, as well as others.

As illustrated, memory 155 of the server appliance 115 includes and/or stores one or more server content objects 170. Memory 155 of the client appliance 125 includes and/or stores one or more client content objects 175. In some embodiments, the server content objects 170 and/or the client content objects 175 may be similar to the data objects 143 stored in the in-memory database 140. For example, the content objects 170 and 175 may be data cubes, tables, reports, or other content sources, such as web content, electronic communications, feeds, and otherwise. Regardless of the form of the content objects 170 and 175, these objects may contain and/or reference business data on which business logic may be applied, e.g., by the contextual workspace module (server) 160 and/or contextual workspace module (client) 165, in order to realize and/or accomplish a task in a business environment.

The illustrated computing system 100 includes a contextual workspace module (server) 160 and a contextual workspace module (client) 165. At a high level, each of the contextual workspace module (server) 160 and a contextual workspace module (client) 165 (referred to collectively as the contextual workspace modules) is any application, program, module, process, or other software that may execute, change, delete, generate, or otherwise manage information according to the present disclosure, particularly in response to and in connection with one or more requests received from the illustrated client appliances 125 and their associated applications. In certain cases, only one contextual workspace module (server) 160 may be located at a particular server appliance 115. In others, a plurality of related and/or unrelated contextual workspace module (server) 160 may be stored at a single server appliance 115, or located across a plurality of other server appliances 115 in the server system 105, as well.

In certain cases, the contextual workspace modules may be implemented as composite applications. For example, portions of the composite application may be implemented as Enterprise Java Beans (EJBs) or design-time components may have the ability to generate runtime implementations into different platforms, such as J2EE (Java 2 Platform, Enterprise Edition), ABAP (Advanced Business Application Programming) objects, or Microsoft's .NET, among others. Additionally, the contextual workspace modules may represent web-based applications accessed and executed by remote client appliances 125 or client applications via the network 120 (e.g., through the Internet).

Further, while illustrated as internal to server appliance 115, one or more processes associated with the contextual workspace module (server) 160 may be stored, referenced, or executed remotely. For example, a portion of the contextual workspace module (server) 160 may be a web service associated with the application that is remotely called, while another portion of the contextual workspace module (server) 160 may be an interface object or agent bundled for processing at a remote client appliance 125 via the contextual workspace module (client) 165. Moreover, any or all of the contextual workspace modules may be a child or sub-module of another software module or enterprise application (not illustrated) without departing from the scope of this disclosure.

As explained more fully below, one or both of the contextual workspace modules 160 and 165 may present or facilitate presentation of a user interface, e.g., through GUI 117 and/or GUI 127, to a business user to perform a variety of tasks. For instance, the contextual workspace modules 160 and 165 may present one or more workspace modules containing business data relevant to the business user in a variety of forms, e.g., tables, graphs, notes, and otherwise. The relevant business data may be sourced from, for example, the data objects 143 or other content sources.

Figure 2B:
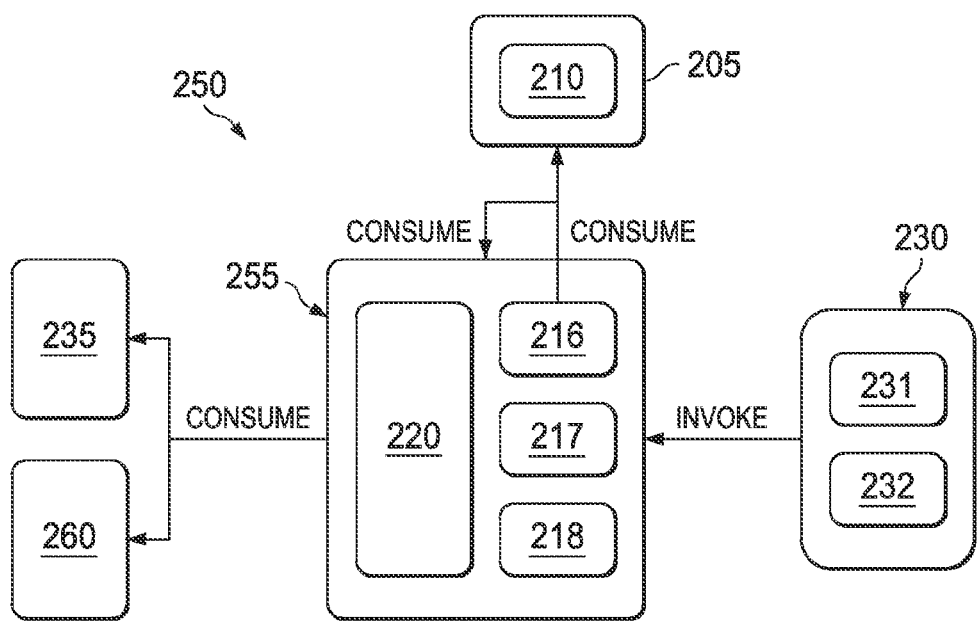

FIGS. 2A-2B illustrate additional example distributed computing systems 200 and 250, respectively, operable to generate, view, modify, and/or otherwise manipulate a contextual workspace. Distributed computing systems 200 and 250, in some embodiments, may illustrate two different example configurations for deployment of a contextual workspace within a distributed computing environment. For example, in some instances, either of the distributed computing systems 200 or 250 may represent an alternate deployment of a contextual workspace within a distributed computing environment to the computing system 100 shown in FIG. 1.

Turning to FIG. 2A, the illustrated distributed computing system 200 includes a web portal 205 communicably coupled to a virtual appliance 215 and an in memory database 220. In some embodiments, the web portal 205 provides an authentication portal allowing a single point of access to applications, business data, and services both within and external to a business enterprise. For instance, an employee or user of the business enterprise may access the virtual appliance 215 and/or the in-memory database 220 via the web portal 205. In other words, the web portal 205 may provide a front end accessible through a client appliance located at the business enterprise.

The illustrated web portal 205 includes a client enterprise workspace 210. In some aspects, the client enterprise workspace 210 may be substantially similar to the contextual workspace module (client) 165 shown in FIG. 1. For instance, the client enterprise workspace 210 may present or facilitate presentation of a user interface (e.g., one or more workspace modules described more fully below) to the business user to perform a variety of tasks.

The illustrated virtual appliance 215 may be substantially similar to the server appliance 115 illustrated in FIG. 1 and include a server enterprise workspace 216, a business intelligence module 217, and an open source module 218. The server enterprise workspace 216, in some implementations, may be substantially similar to the contextual workspace module (server) 160 shown in FIG. 1. For instance, the server enterprise workspace 216 may provide for a customizable and dynamic virtual workspace accessible to a client and/or user via a GUI, e.g., through the web portal 205. In some aspects, as explained more fully below, such a virtual contextual workspace may provide for a number of functional features and advantages, such as, for instance, providing semantic context to relevant business data, providing suggestions to the user to add semantic and/or social data, and generating a number of ranked suggestions to add semantic data to the workspace according to social criteria.

The illustrated business intelligence module 217, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

The illustrated open source module 218, in some embodiments, may be an open source web application framework, such as, for example, a Rails (or RoR) for the Ruby programming language. In some embodiments, the module 218 may provide generic services like authentication, authorization, repository, logging, and otherwise.

The illustrated virtual appliance 215 is communicably coupled to a business object repository 235 in order to consume (e.g., retrieve, modify, manipulate or otherwise) business objects relevant to the business enterprise. Each business object stored on the repository 235, for example, a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contains four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

The illustrated system 200 includes the in-memory database 220 communicably coupled to the web portal 205 and the virtual appliance 215. For example, as illustrated, the in-memory database 220 may be invoked by either or both of the web portal 205 and the virtual appliance 215. The in-memory database 220 may be substantially similar to the in-memory database 140 described in FIG. 1. Further, the in-memory database 220 includes in-memory business logic 225 (which, as illustrated, may be invoked by either or both of the web portal 205 and the virtual appliance 215). The in-memory business logic 225 may include a combination of one or more of software, middleware, and hardware (or other logic) operable to manipulate one or more data objects (e.g., stored in-memory on the database 220). For instance, the in-memory business logic 225 may perform functionality associated with and/or used by the enterprise workspace (client) 210 and/or enterprise workspace (server) 216, such as the methods described with reference to FIGS. 5-7 and 9, as well as other functionality disclosed herein.

The illustrated in-memory database 220 is communicably coupled to a business suite 240. In some embodiments, as described above, complete or partial processing may be done directly on a database, thus rendering making components like the "database," "server," and/or "suite" substantially similar or identical. At a high level, the business suite 240 may consist of one or more integrated enterprise applications enabling, e.g., business enterprises, to execute and optimize business and IT strategies, such as performing industry-specific, and business-support processes. In some embodiments, the business suite 240 may be built on an open, service-oriented architecture (SOA). Such integrated business applications may be replicated, for example, via the web portal 205 through the in-memory database 220, such as via the enterprise workspace (client) 210.

The illustrated in-memory database 220 is also communicably coupled to third party content 245. The third party content 245, for example, may be substantially similar to data stored and/or referenced by the remote computing system 135 described with reference to FIG. 1, such as, for example, the third party content 135. In some aspects, the third party content 245 may be stored and/or accessed through relational databases (i.e., relational databases stored on magnetic memory that require a process, e.g., ETL, to transfer data from one system to another not in real time but with a delay of an hour, day, week, or longer). For instance, while some business data may be stored on the in memory database 220 and therefore, be accessible in real-time, some business data may be available to and/or exposed by the in-memory business logic 225, such as the third party content 245.

The illustrated system 200 also includes one or more clients 230. For instance, as illustrates, the clients 230 may include a mobile client 231, and a web workspace 232. One or more of the clients 230 may invoke, for example, the enterprise workspace (server) 216, on the virtual appliance 215 in order to access and/or expose the functionality of the in-memory business logic 220. For example, the mobile client 231 may facilitate invocation of the enterprise workspace (server) 216 from a mobile device (e.g., cell phone, smart phone, email mobile device, PDA, or other mobile device). The web workspace 232 may, for instance, facilitate invocation of the enterprise workspace (server) 216 through a network connection, such as the global network known as the world wide web.

Turning to FIG. 2B, the illustrated distributed computing system 250 includes the web portal 205 communicably coupled to an in-memory application server 255, which, in turn, is communicably coupled to the clients 230, the business object repository 235, and a business financial management module 260. Accordingly, as illustrated, the distributed computing system 250 may provide for an alternative deployment configuration of a system operable to generate, view, modify, and/or otherwise manipulate a contextual workspace, as compared to the system 200, but with similar (or identical) components in some respect. For example, as illustrated, the in-memory application server 255 in system 250 may replace the virtual appliance 215/in-memory database 220 shown in FIG. 1. The in-memory application server 255, as illustrated, includes the in-memory database 220 (including, for example, the in-memory business logic 225, not shown here). The in-memory application server 255, as illustrated, also includes the server enterprise workspace 216, the business intelligence module 217, and the open source module 218.

The illustrated business financial management module 260, generally, supports IT services costing, customer value analysis, cost to serve, bill of material costing, and activity based costing, among other financial metrics. In some implementations, for example, the business financial management module 260 may provide for user-friendly, rapid, and efficient model building; accurate calculation and cross-charge for IT and other shared services; monitoring and manage costs, pricing, and true profitability; accurate assignment of overheads and indirect costs to customers, products, and channels; access to cost and profitability data by customer, product, or business channel; accurate assignment, monitoring, and analysis of overhead costs tied to bill of materials, among other functions.

Figure 3:
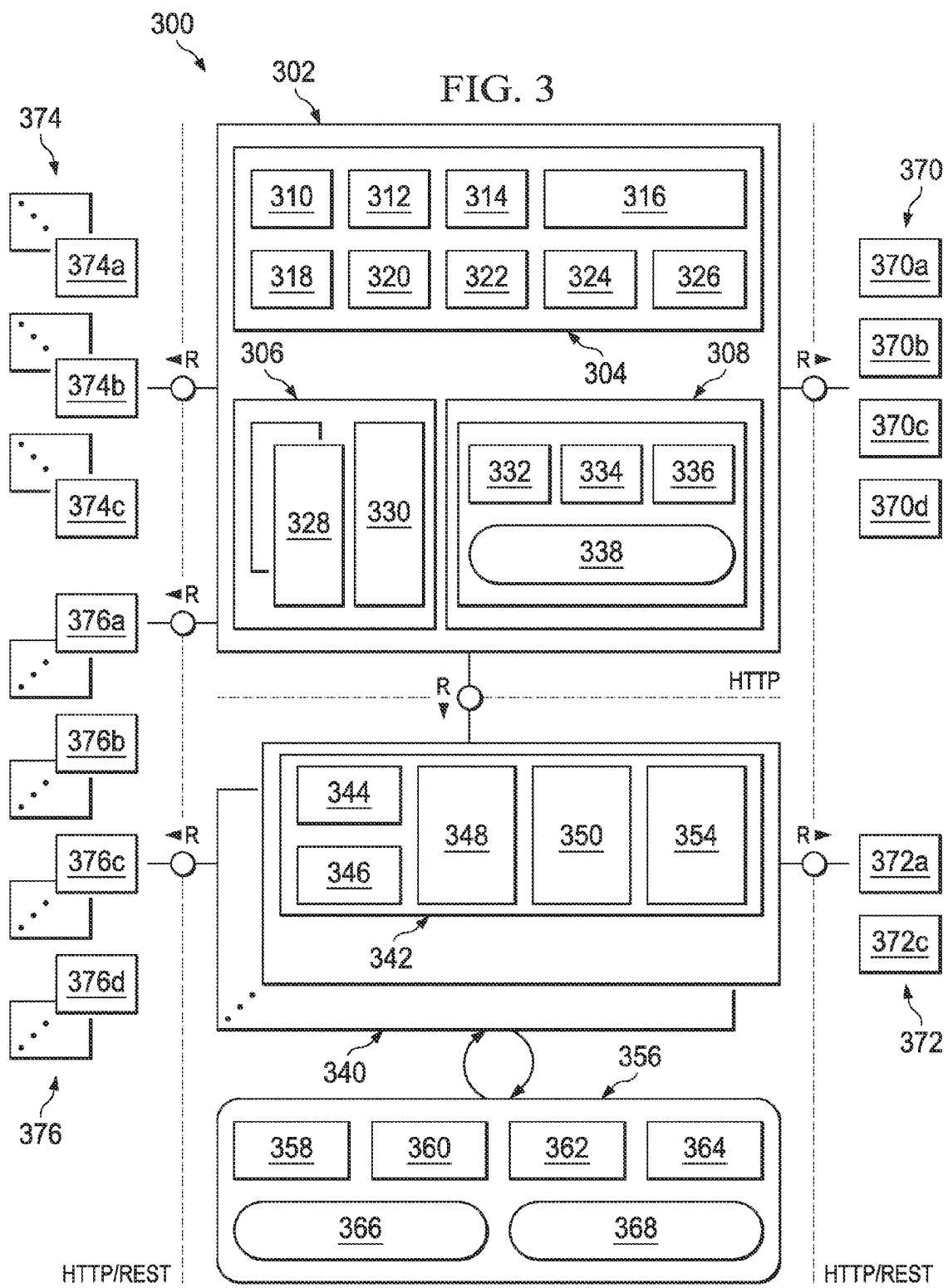
FIG. 3 illustrates an example virtual distributed computing system operable to generate, view, modify, and/or otherwise manipulate a contextual workspace according to the present disclosure.

FIG. 3 illustrates an example virtual distributed computing architecture 300 operable to generate, view, modify, and/or otherwise manipulate a contextual workspace. As illustrated, the virtual distributed computing architecture 300 includes a web client 302, a web server 340, an in-memory computing engine 356, one or more external services 370, one or more consumption channels 372, one or more external content providers 374, and one or more data sources 376. As further illustrated, the web client 302, the web server 340, the in-memory computing engine 356, the one or more external services 370, the one or more consumption channels 372, the one or more external content providers 374, and/or the one or more data sources 376 may be communicably coupled through an HTTP and/or REST architecture.

The illustrated web client 302 includes a UI module 304, a connectivity module 306, and a context module 308. The illustrated UI module 304, in some embodiments, may generate, modify, and/or maintain a virtual contextual workspace and present the workspace to a user through a GUI. The UI module 304 includes a workspace manager 310, a module gallery 312, a layout manager 314, a data orchestrator 316, a contextual assistance module 318, a global filtering module 322, a data streaming module 324, and a timeline module 326. The illustrated workspace manager 310, in some embodiments, may include functionality that manages operation and use of the contextual workspace by the user.

The illustrated module gallery 312, in some embodiments, may keep track of one or more workspace modules (such as the workspace modules shown in FIGS. 4A-4C) viewable on and/or available to a contextual workspace presented to the user. For example, the module gallery 312 may include an index (e.g., stored in a repository) of the current workspace modules being viewed by the user in the contextual workspace.

The illustrated layout manager 314, in some embodiments, may determine how one or more selected and/or requested workspace modules may be arranged on the contextual workspace. For example, the layout manager 314 may determine a size and/or placement of each module on the contextual workspace in order to, for instance, better manage the contextual workspace in the GUI presented to the user.

The illustrated data orchestrator 316, in some embodiments, may determine, for example, one or more available views and/or functionality available to the user with respect to a data cube (e.g., an OLAP cube storing business data exposable to the user). For example, the data orchestrator 316 may determine how to present or show any data model, including a data cube, to the user (e.g., icon, full screen, or something in between).

The illustrated contextual assistance module 318, in some embodiments, may include functionality that provides the user of the contextual workspace generated by the architecture 300 with additional business data contextually relevant with business data being currently viewed in the workspace. For instance, as described below with respect to FIG. 5, the contextual assistance module 318 (or other modules included in the illustrated architecture 300) may identify semantically related information to that currently viewed on the contextual workspace by the user. The semantically related information may be suggested to the user, for example, to add to the contextual workspace through one or more workspace modules.

The illustrated global filtering module 320, in some embodiments, may provide for functionality that, for example, ranks and/or filters various suggestions for content (e.g., semantically related content or socially related content) to be added to the user's contextual workspace through architecture 300. For instance, as described below with respect to FIG. 9, the global filtering module 320 (or other modules included in the illustrated architecture 300) may rank suggestions to add semantically related data to the user's contextual workspace according to one or more social metrics.

The illustrated data annotations module 322, in some embodiments, may provide for functionality that, for example, allows a user to generate notes (or other annotations) that provide specific context to data within one or more workspace modules in the contextual workspace. For instance the data annotations module 322 may, in some aspects, allow the user to dynamically create and/or view insights (e.g., notes or other annotations) on contexts of data within the contextual workspace. The insights could be for the user or other users (e.g., a collaboration).

The illustrated data streaming module 324, in some embodiments, may manage, direct, and/or control the transfer of data (e.g., from data objects, data cubes, documents, reports, feeds, and other data sources) to, for example, the web client 302. For instance, the data streaming module 324 may manage the speed at which data is transferred to the web client 302 to, for example, expose on one or more workspace modules of the contextual workspace generated and presented to the user.

The illustrated timeline module 326, in some embodiments, may provide for functionality that allows a user to "time travel" through one or more previous views of a contextual workspace. For instance, in some embodiments, each distinct contextual workspace (i.e., each view with a distinct set, combination, and/or number of workspace modules included within the contextual workspace) may be time stamped with a particular time (e.g., hour/minute/day, date, week, month, or other granularity). The time stamp may be part of the metadata of the contextual workspace generated by and presented to the user. In some aspects, the user may "time travel" back in time to view previous versions of the contextual workspace according to the time stamp. Thus, not only the data contained in the contextual workspace, but the user's subjective view on the data (e.g., which workspace modules were selected) can be retrieved. The user may filter the contextual workspace versions by the time stamp, data exposed in the contextual workspaces, keywords, and/or other metrics.

The illustrated connectivity module 306 includes, in some embodiments, context sources module 328 and a content fetching module 330, and, in some aspects, may provide connection functionality for the web client 302 to communicate with, for example, the web server 340, the in-memory computing engine 356, the data sources 376, and/or other content repositories or sources. The illustrated context sources module 328, in some embodiments, may provide for functionality to the web client 302 to connect to various sources of contextually relevant (e.g., semantically relevant) data related to one or more workspace modules in the contextual workspace. For example, semantically relevant data may be exposed from, for example, data objects, data cubes, documents, search functions, social data (e.g., people), and other sources. In some embodiments, for example, the context sources module 328 may function along with other components of the illustrated architecture (e.g., the contextual services manager 350, the social suggestions module 358, and other components) to perform the functionality described in FIGS. 5-7 and 9, as well as other processes and methods described herein.

The illustrated content fetching module 330, in some embodiments, may provide functionality to retrieve and/or gather data content from one or more data sources, such as, for example, data objects, data cubes, documents, search functions, social data (e.g., people), and other sources.

The illustrated context module 308 includes, in some embodiments, a context discovery module 332, a suggestions and rankings module 334, an events and alerts module 336, and a context model 338. In some aspects, the context module 308 may provide functionality related to discovering and/or suggesting semantically relevant data (e.g., from data objects, data cubes, and otherwise) related to data being viewed by the user on the contextual workspace. The illustrated context discovery module 332, in some embodiments, may provide functionality related to searching for and/or exposing semantically relevant content related to data on the contextual workspace, e.g., in one or more workspace modules. For example, semantically relevant data may include information related to data that the user works with or views in the contextual workspace and/or arranges (according to his/her expertise) within the contextual workspace. For instance, the arrangement of data (e.g., which workspace modules are selected and/or viewed) may provide at least a portion of the overall context of the workspace apart from the data (numerical or otherwise). The semantically relevant data may be related, e.g., according to keywords, metadata, cube dimensions, cube measures, cube views, table headings, etc., which may be unknown to the user (due to, for instance, the vast amount of data available to the user).

The illustrated suggestions and rankings module 334, in some embodiments, may include functionality that provides suggestions of semantically relevant data to the user to add to the contextual workspace. The suggestions and rankings module 334 may also include functionality that ranks a number of suggestions of semantically relevant data according to, for example, matching keywords, matching metadata, social metrics, and/or other criteria. For instance, in some aspects, the suggestions and rankings module 334 may include functionality illustrated in one or more of the methods shown in FIGS. 5-7 and 9.

The illustrated events and alerts module 336, in some embodiments, may include functionality that allows the user set an alert, e.g., at a given point of time when a particular event is occurring. The user, therefore, may be reminded (at a later time) of how that particular problem was resolved. In some aspects, the events and alerts module 336 may also provide a user with notification (via one or more workspace modules of the contextual workspace) of events and/or alerts based on, for instance, actions of other users with similar roles within the business enterprise (e.g., within the same organization unit, or having the same title).

The illustrated context model 338, in some embodiments, may build and/or generate a model (e.g., a context bag) containing the discovered semantically relevant data related to the contextual workspace data exposed in one or more workspace modules.

The illustrated web server 340 includes a workspace services module 342. The illustrated workspace services module 342 includes a content provider manager 344, a workspace data manager 346, a context data manager 348, a contextual services manager 350, and a data acquisition and modeling module 354. The illustrated content provider manager 344 and the illustrated workspace data manager 346, in some embodiments, may direct, control, and/or otherwise manage the content and data exposed on the one or more workspace modules in the contextual workspace.

The illustrated context data manager 348, in some embodiments, may direct, control, and/or otherwise manage semantically relevant content (e.g., determined according to, for example, metadata contained in the workspace modules on the contextual workspace). For example, the context data manager 348, either alone or along with one or more other components of the architecture 300 (e.g., the semantic suggestions module 360, the suggestions and rankings module 334, and/or other components) may provide functionality illustrated in one or more of the methods shown in FIGS. 5-7 and 9. In some embodiments, the illustrated contextual services manager 350 may include functionality that assists (at least partially) the context data manager 348 in directing, controlling, and/or otherwise managing semantically relevant.

The illustrated data acquisition and modeling module 354, in some embodiments, may perform modeling functionality on business data to be exposed in one or more workspace modules in the contextual workspace. For instance, the data acquisition and modeling module 354 may model data objects, such as data cubes, as three-dimensional workspace modules in the contextual workspace.

The illustrated in-memory computing engine 356 includes a social suggestions module 358, a semantic suggestions module 360, an alert engine 362, a data annotations module 364, a context database 366, and a business suite database 368. In some embodiments, the social suggestions module 358 may, in some embodiments, include functionality that provides suggestions of socially relevant data to the user to add to the contextual workspace. For instance, the suggestions may include business data that other users (e.g., other business users in the same organizational unit of the enterprise, same team of the user, or same role of the user, to name a few) found relevant and/or useful. The suggested business data may also be contextually relevant to one or more workspace modules active in the user's contextual workspace. The social suggestions module 358 may, in some aspects, include functionality illustrated in one or more of the methods shown in FIGS. 5-7 and 9.

The illustrated semantic suggestions module 360, in some embodiments, include functionality that provides suggestions of semantically relevant data to the user to add to the contextual workspace. For instance, the suggestions may include business data that has some related contextual similarity with data exposed in one or more workspace modules in the user's contextual workspace. For example, the semantically relevant data may be business data from a data cube having one or more similar dimensions and/or measures as compared to a data cube currently being viewed and/or analyzed in the contextual workspace. As another example, the semantically relevant data may be business data from a table having a similar heading to a table currently being viewed in the contextual workspace. Thus, the suggested semantically relevant data may be business data that provides insight to the user that the business user would not have known about otherwise. The semantic suggestions module 360 may, in some aspects, include functionality illustrated in one or more of the methods shown in FIGS. 5-7 and 9.

The illustrated alert engine 362, in some embodiments, in some embodiments, may include functionality that allows the user set an alert, e.g., at a given point of time when a particular event is occurring. The user, therefore, may be reminded (at a later time) of how that particular problem was resolved. In some aspects, the alert engine 362 may also provide a user with notification (via one or more workspace modules of the contextual workspace) of alerts based on, for instance, actions of other users with similar roles within the business enterprise (e.g., within the same organization unit, or having the same title).

The illustrated data annotations module 364, in some embodiments, may provide for functionality that, for example, allows a user to generate notes (or other annotations) that provide specific context to data within one or more workspace modules in the contextual workspace. For instance the data annotations module 364 may, in some aspects, allow the user to dynamically create and/or view insights (e.g., notes or other annotations) on contexts of data within the contextual workspace. The insights could be for the user or other users (e.g., a collaboration).

The illustrated context database 366, in some embodiments, may store and/or reference one or more contextually relevant data objects, such as data objects that have been determined (e.g., by one or more components of the architecture 300 such as the social suggestions module 358, the semantic suggestions module 360, or other component) to be socially and/or semantically relevant based on one or more workspace modules in the contextual workspace. For example, the context database 366 may store and/or reference one or more data cubes, reports, documents, business objects, or other data objects. In some embodiments, the context database 366 may also store and/or reference one or more suggestions (e.g., social, semantic, or otherwise) generated by the architecture 300.

The illustrated business suite database 368, in some embodiments, may store and/or reference business data, such as business data utilized by the business suite app 374a.

The illustrated external services 370 include an event insight 370a, social intelligence 370b, text analysis 370c, and feed services 370d. Generally, the illustrated external services 370 may provide business data (e.g., semantically and/or or socially relevant business data) to at least one of the web client 302, the web server 340, and/or in-memory computing engine 356. For instance, the illustrated event insight 370a, in some embodiments, may provide alerts to the web client 302 and/or web server 340 to present to the business user through one or more workspace modules of the contextual workspace. The illustrated social intelligence 370b, in some embodiments, may provide social business data (e.g., social connections between one or more business users in a business enterprise) to the web client 302 and/or web server 340 to present to the business user through one or more workspace modules of the contextual workspace. For example, the social business data may be a graph and/or chart showing business connections between employees, such as, for instance, a degree of connection between the employees (e.g., through one or more known business contacts). The illustrated text analysis 370c, in some embodiments, may identify business data located in documents or other data objects through, for instance, a keyword search or metadata search of the text in the documents. The illustrated feed services 370d, in some embodiments, may provide business data through one or more web feeds to the web client 302 and/or web server 340 (e.g., RSS feeds).

The illustrated consumption channels 372 include a mobile channel 372a and one or more feed clients 372c. Typically, the consumption channels 372 may also provide business data (e.g., semantically and/or socially relevant business data) to at least one of the web client 302, the web server 340, and/or in-memory computing engine 356. For instance, the illustrated mobile channel 372a, in some embodiments, may provide business to the web client 302 and/or web server 340 from one or more mobile channels to present to the business user through one or more workspace modules of the contextual workspace.

The illustrated feed clients 372c, in some embodiments, may include, for example, a mail client, which may provide business data to at least one of the web client 302, the web server 340, and/or in-memory computing engine 356 through one or more electronic communications.

The illustrated external content providers 374 include one or more UI applications, such as a business suite app 374a, a business intelligence app 374b, and a social gadget app 374c. Typically, the external content providers 374 provide for a number of UI applications that may be interfaced by a user, e.g., through the web client 302 or otherwise. The business suite app 374a, for example, may be business applications that provide integration of information and processes, collaboration, industry-specific functionality, and scalability. For instance, the business suite app 374a may include one or more constituents, such as CRM (Customer Relationship Management), ERP (Enterprise Resource Planning), PLM (Product Lifecycle Management), SCM (Supply Chain Management), and/or SRM (Supplier Relationship Management). The business intelligence app 374b, for example, may provide for a UI application that may be used in identifying and extracting business data (e.g., ETL) and analyzing such business data. The business data may include, for example, sales revenue, profits, and/or costs broken down by products and/or departments. In some aspects, the business intelligence app 374b may provide for historical, current, and/or predictive views of business operations, such as reporting, online analytical processing, analytics, data mining, process mining, business performance management, benchmarking, text mining, and/or predictive analytics. In some aspects, the business intelligence app 374*b* may also provide for layers including an ETL layer (e.g., responsible for extracting data from a specific source, applying transformation rules, and loading it into a data warehouse); the data warehouse (e.g., responsible for storing the information in various types of structures); reporting (e.g., responsible for accessing the information in the data warehouse and presenting it in a user-friendly manner to the business user); and a planning and analysis layer (e.g., provides capabilities for the user to run simulations and perform tasks such as budget calculations). The illustrated social gadget app 374*c*, for example, may include games, social news feeds and other UI apps.

The illustrated data sources 376 include an in-memory database 376*a*, a gateway 376*b*, one or more feeds 376*c*, and one or more documents 376*d*. Typically, the data sources 376 may provide data, such as business data, to the illustrated web client 302 and/or web server 340 that may be manipulated to, for instance, provide suggestions of additional contextual data, provide suggestions of semantically-related data, and/or provide other suggestions, alerts, or events. For example, the in-memory database 376*a* may store and/or reference one or more data cubes containing business data. The gateway 376*b* may, for example, be a front-end server to the business suite app 374 and expose business suite services in an open protocol format. The feeds 376*c*, for instance, may provide business and/or social data through social updates, for example, Twitter, Facebook, RSS feed/channels, and/or other feed sources or channels. The documents 376*d*, for instance, may be any number of documents stored in or referenced by a document store (i.e., in a relational database or otherwise).

Figure 4A:
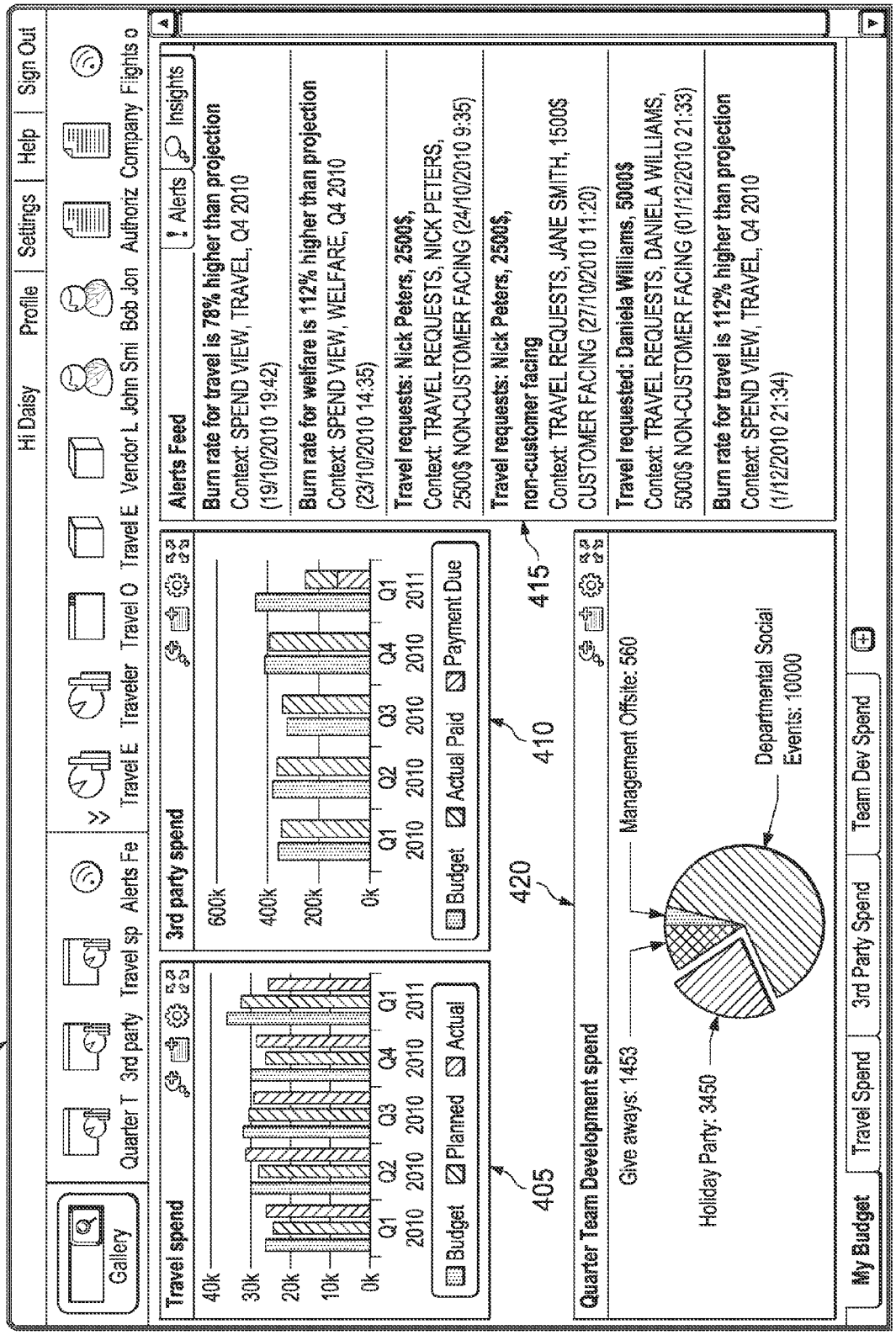
FIGS. 4A-4C illustrate example contextual workspaces having one or more workspace modules according to the present disclosure.
Figure 4B:
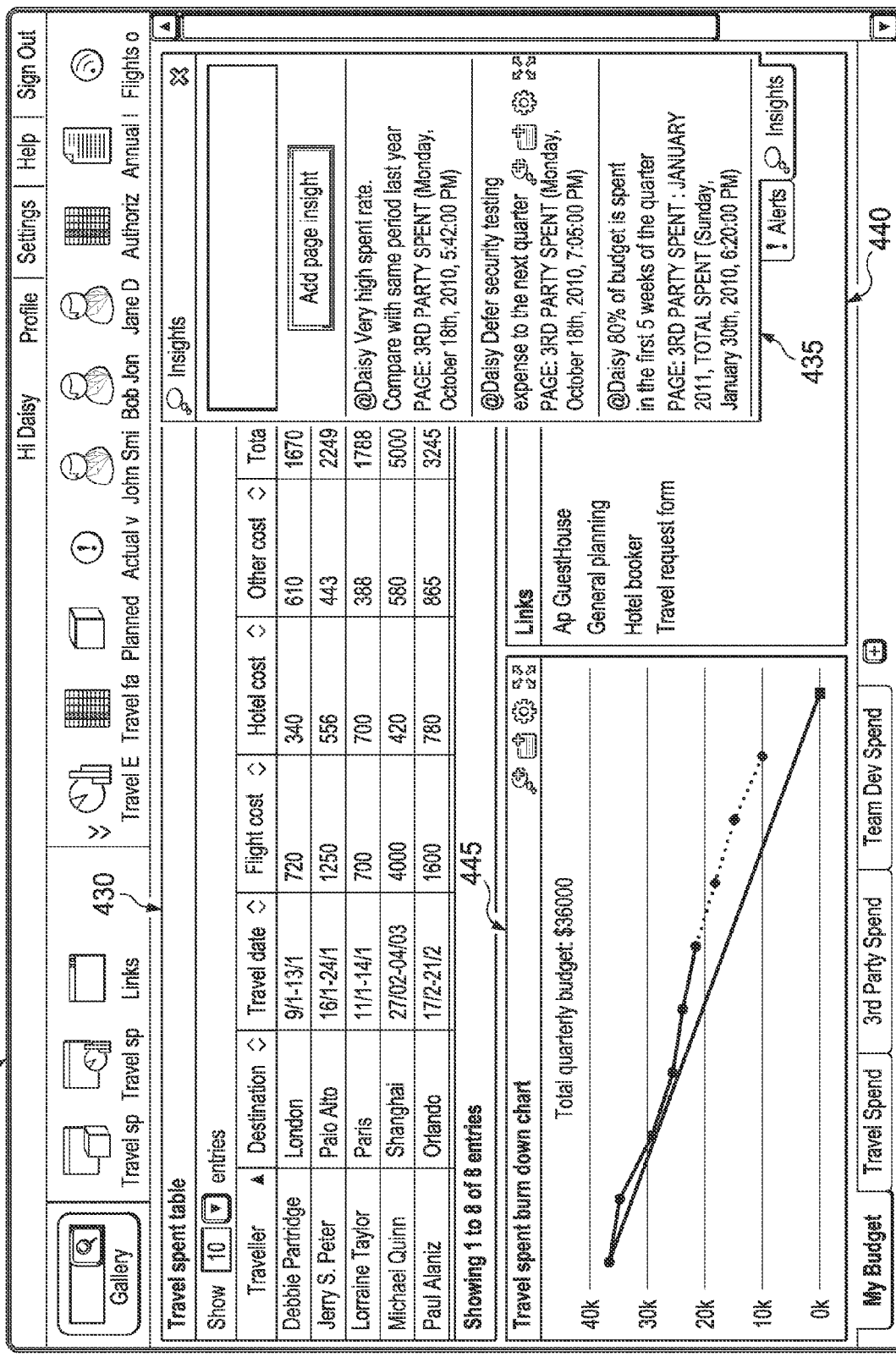

FIGS. 4A-4B illustrate example virtual contextual workspaces 400, 425, and 450, respectively, having one or more workspace modules. In some embodiments, one or more of the workspace modules (e.g., workspace modules 405, 410, 415, and 420 illustrated in FIG. 4A) may be a combination of iFrames and/or Div frames, which may expose underlying business data, e.g., from one or more data sources illustrated in FIGS. 1, 2A-2B, and/or 3. Further, the illustrated workspace modules may include or describe data that is contextually relevant and/or related within the virtual contextual workspace.

Turning to FIG. 4A, the illustrated virtual contextual workspaces 400 includes workspace modules 405, 410, 415, and 420. The illustrated workspace module 405, for example, shows a module including a bar graph, e.g., of travel spending by time period. The illustrated workspace module 410, for example, shows a module including a bar graph, e.g., of third party spending finances by time period. The illustrated workspace module 415, for example, shows a module including a list of alert feeds, e.g., of alerts related to travel spending and/or travel requests of a business enterprise. The illustrated workspace module 420, for example, shows a module including a pie graph, e.g., of development spending of an organizational unit of the enterprise during a specific time duration.

As illustrated, one or more of the workspace modules 405, 410, 415, and 420 may be semantically related. In other words, one or more of the workspace modules 405, 410, 415, and 420 may display and/or expose business data that is related by some specific context. For instance, semantically related data may be arranged in the workspace modules 405, 410, 415, and 420 according to how the business user works on the contextual workspace 400 (e.g., how the user puts things together (according to his/her expertise)). While the user may not know all the available data, there may be a context to the workspace 400 that he/she understands. This context, for instance, could be keywords, metadata, dimensions/slices of data, and otherwise. While other users (even other users within the same business enterprise, same organization unit, or otherwise) may not understand the context of the workspace 400, the user understands the desired context. The user, however, likely does not know (or is not aware of) all of the data that is available for this context.

Turning to FIG. 4B, the illustrated virtual contextual workspaces 425 includes workspace modules 430, 435, 440, and 445. The illustrated workspace module 430, for example, shows a module including a table, e.g., of entries for travel spending by employee. The illustrated workspace module 435, for example, shows a module including insights, e.g., of an enterprise employee and/or user of the contextual workspace 425 providing business insights related to the workspace. For example, module 435 shows insights related to business employee travel spending and financial data. The illustrated workspace module 440, for example, shows a module including a list of links, e.g., of websites (external and internal), contact names, and/or forms, relevant to the contextual workspace 425. The illustrated workspace module 445, for example, shows a module including a bar graph, e.g., of spent travel budget for the enterprise during a specific time duration.

Figure 4C:
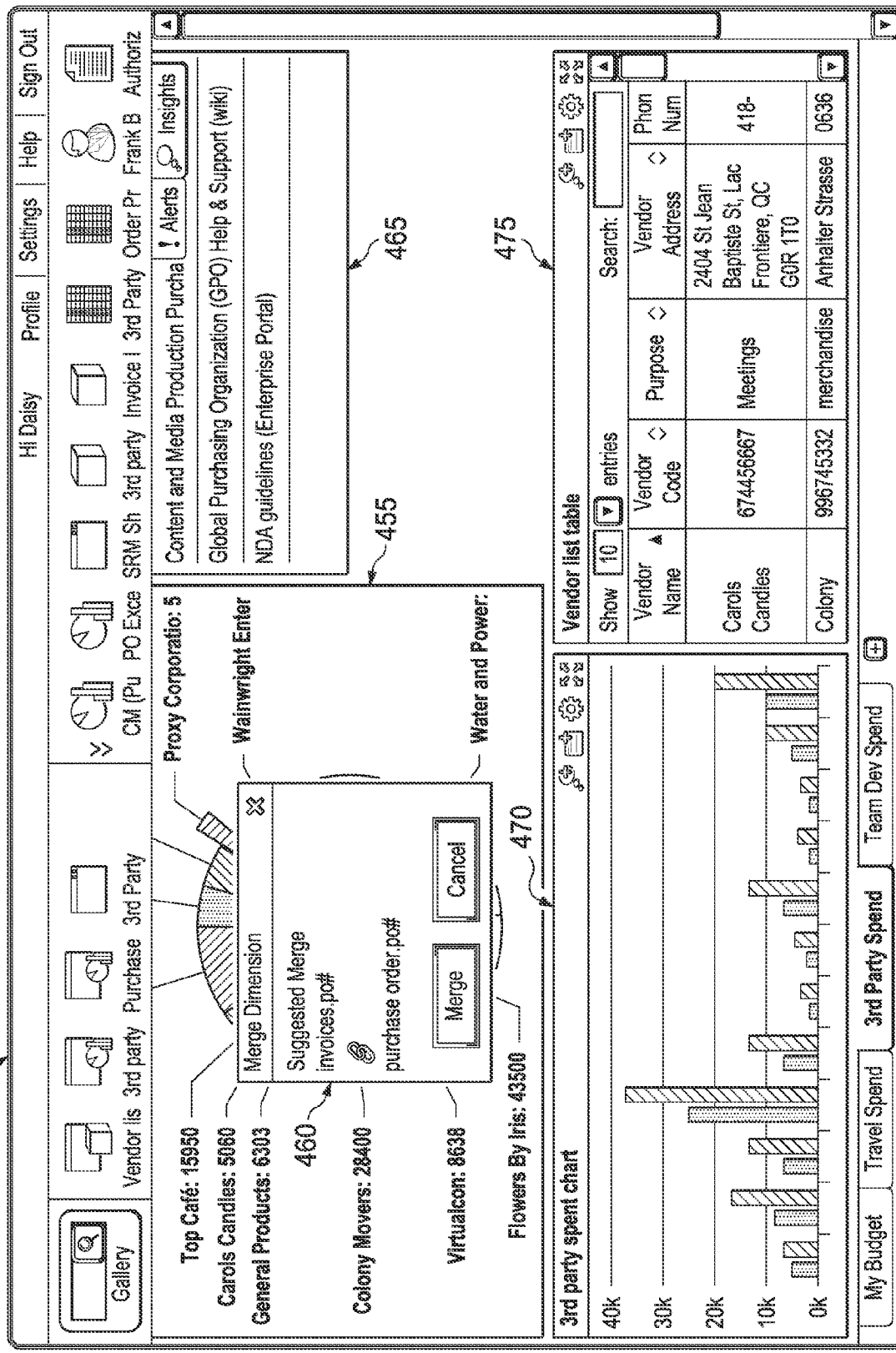

Turning to FIG. 4C, the illustrated virtual contextual workspaces 450 includes workspace modules 455, 465, 470, and 475. The illustrated workspace module 455, for example, shows a module including a pie graph, e.g., of travel spending by vendor, along with a suggestion 460 to merge different types of documents (here, invoices and purchase orders). The illustrated workspace module 465, for example, shows a module including insights, e.g., of websites (external and internal) that may provide some contextually relevant data for the workspace 465. The illustrated workspace module 470, for example, shows a module including a bar graph, e.g., of travel spending by entity (here a third party). The illustrated workspace module 475, for example, shows a module including a table, e.g., of entries for vendor contact information.

Figure 5:
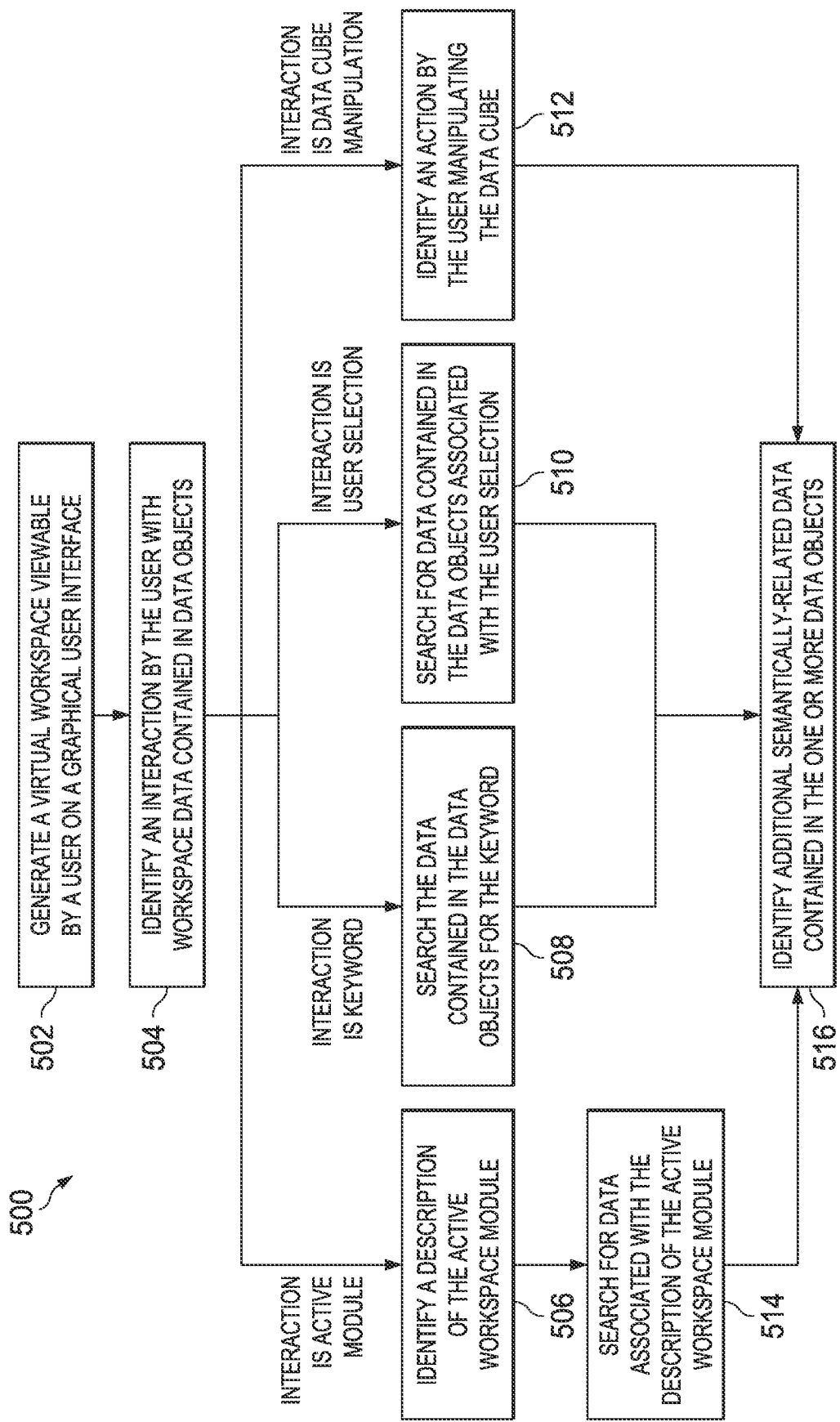
FIG. 5 illustrates an example method for using a contextual workspace according to the present disclosure.

FIG. 5 illustrates an example method 500 for using a contextual workspace. For example, in some embodiments, method 500, when implemented, may identify semantically related information to that viewable on the contextual workspace by a user. In some embodiments, method 500 may be performed on any of the illustrated computing environments of FIGS. 1, 2A, 2B, and 3, as well as other appropriate computing environments. Method 500 may be performed, at least in part, by the web client 302, the web server 340, the in-memory computing engine 356, and/or a combination thereof, e.g., by the contextual assistance module 318, the contextual services manager 350, and/or other components of architecture 300 ("contextual services modules"). Method 500 may begin at step 502, when the web client 302, the web server 340, and/or the in-memory computing engine 356 generate a virtual workspace viewable by a user on a graphical user interface. For example, in some embodiments, the virtual workspace may be one of the example contextual workspaces illustrated in FIGS. 4A-4C.

In step 504, the contextual services modules identify an interaction by the user with workspace data contained in data objects. The user interaction with workspace data in the contextual workspace may be identified in a number of ways. For example, the interaction may be an activation of a particular workspace module within the contextual workspace (e.g., making the particular module the active workspace module). As another example, the interaction may be a placement of a user pointer (e.g., a cursor) above (i.e., coincident with) a location of a particular workspace module in the contextual workspace. For instance, the user may "hover" the cursor over the particular module. As yet another example, the interaction may include an identification of a keyword (e.g., text or metadata) associated with one or more workspace modules in the contextual workspace). For instance, the user may highlight, select, and/or otherwise identify (e.g., through a search) the keyword within the contextual workspace. As another example, the interaction may include a selection of one or more data objects (e.g., text, business objects, data cubes, workspace modules, or otherwise) exposed and/or presented in the contextual workspace (e.g., through one or more workspace modules).

In addition, the interaction may be a manipulation of a data object, such as a data cube. For example, the manipulation may include, among others, an identification of a dimension, measure, and/or view of the data cube. The manipulation may also include, for instance, slicing, dicing, and/or pivoting the data cube.

If the identified interaction is an active module of the virtual workspace, then the contextual services modules identify a description of the active workspace module in step 506. In some aspects, the description may be the title and/or heading of the active workspace module. In other aspects, the description may be a metadata description of the active workspace module, not shown to the user through the contextual workspace. For example, if the active workspace module is a report, the description may be the title of the report. Next, the contextual services modules search for data associated with the description of the active workspace module in step 514. For instance, the contextual services modules may search for related data in data objects, e.g., stored in a repository such as an in-memory database, that is semantically related to the identified description. For example, the semantically related data may contain and/or have the same description as the active workspace module (e.g., the same title).

If the identified interaction is a keyword in the virtual workspace, then the contextual services modules search the data contained in the data objects (e.g., other data cubes stored in an in-memory database) for the keyword in step 508. As one example, the keyword, which may be metadata, may refer to a particular supplier, vendor, customer, and/or client of a business enterprise. The searched data objects, therefore, may include all (or a portion) of the stored data objects referring to and/or including the particular supplier, vendor, customer, and/or client of a business enterprise.

If the identified interaction is user selection, then the contextual services modules search for data contained in the data objects (e.g., other data cubes stored in an in-memory database) associated with the user selection in step 510. As one example, the user selection may be particular text contained in a report (e.g., text describing a specific product). The searched data objects, therefore, may include all (or a portion) of the stored data objects referring to and/or including the particular text selection regarding the product.

If the identified interaction is a data cube manipulation, then the contextual services modules identify an action by the user manipulating the data cube in step 512. The manipulation may include, for instance, an identification of a particular portion of the data cube, e.g., a measure, dimension, view, or otherwise. The manipulation may also include, for instance, an action performed on the data cube, such as a slice, dice, pivot, or otherwise. In identifying the manipulation, the contextual services modules may also search and identify other data cubes having, for example, similar measures, dimensions, and/or views as the data cube manipulated by the user.

Regardless of the identified interaction, the contextual services modules identify additional semantically-related data contained in the one or more data objects in step 516. The semantically-related (e.g., relevant) data may include, for instance, additional data cubes having similar views, measure, dimensions, or otherwise. The data may also include other data objects having the same, e.g., keywords, descriptions, titles, metadata, text, as that identified by the business user through the contextual workspace.

Method 500 may include other aspects as well. For instance, in some aspects, the identified semantically relevant data may be stored (separately or otherwise). In some further aspects as described above, the searched data objects may be stored in an in-memory database (e.g., the in-memory database 140), thereby allowing real-time searching and identification of the semantically relevant data.

Figure 6:
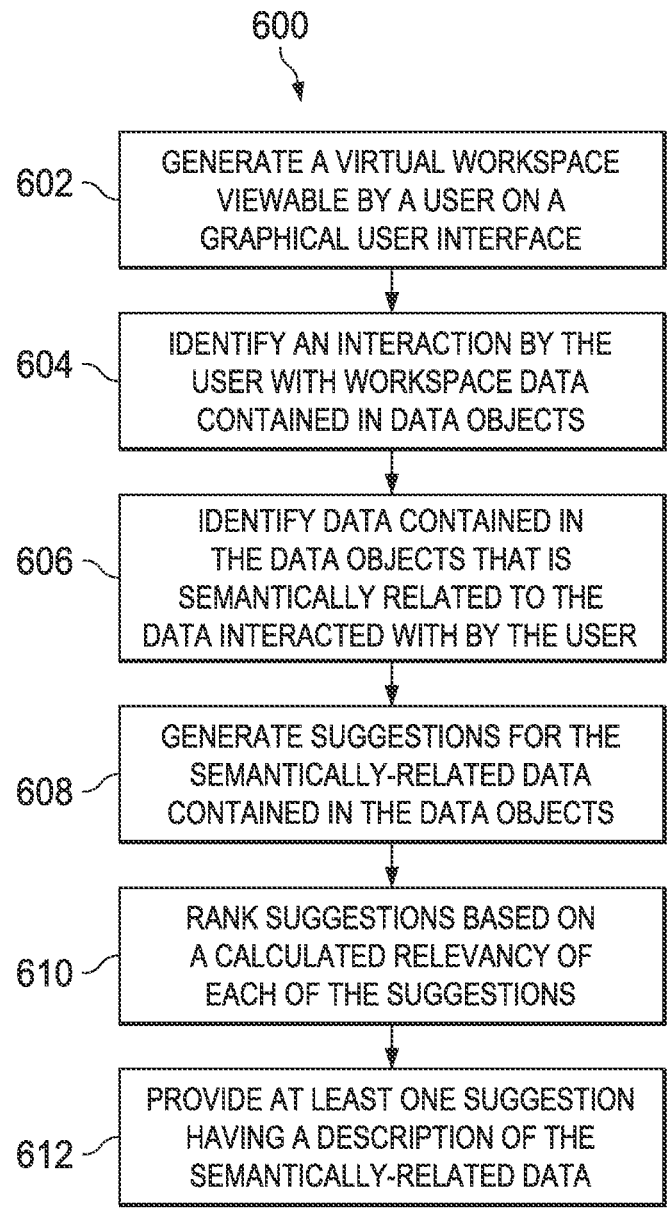
FIG. 6 illustrates another example method for using a contextual workspace according to the present disclosure.

FIG. 6 illustrates another example method 600 for using a contextual workspace. For example, in some embodiments, method 600, when implemented, may provide a suggestion to a user of the contextual workspace to add semantically related information to the contextual workspace of the user. In some embodiments, method 600 may be performed on any of the illustrated computing environments of FIGS. 1, 2A, 2B, and 3, as well as other appropriate computing environments. Method 600 may be performed, at least in part, by the web client 302, the web server 340, the in-memory computing engine 356, and/or a combination thereof, e.g., by the suggestions and rankings module 334, the semantic suggestions module 360, other components, and/or a combination thereof ("semantic suggestions modules"). Method 600 may begin at step 602, when the web client 302, the web server 340, and/or the in-memory computing engine 356 generate a virtual workspace viewable by a user on a graphical user interface. For example, in some embodiments, the virtual workspace may be one of the example contextual workspaces illustrated in FIGS. 4A-4C.

In step 604, the semantic suggestions modules identify an interaction by the user with workspace data contained in data objects. The interaction by the user may be a variety of different interactions. For instance, the interaction may be an identification of a workspace module added to the virtual contextual workspace by the user. The interaction may also be an identification of a selection of a workspace module among several workspace modules on the user's contextual workspace. As another example, the interaction may be an identification of a selection of data contained in the particular data object by the user, such as, for example, a selection of text in a document, a selection of a heading in a table, and/or a selection of an axis or data point in a graph. As yet another example, the interaction may be an identification of a metric of a particular data object in a workspace module among several metrics.

In some embodiments, one or more data objects viewable and/or manageable within the workspace modules in the contextual workspace may be data cubes. In such embodiments, the interaction by the user may be an interaction with at least some of the data contained in a particular data cube of the data cubes exposed in one or more workspace modules within the contextual workspace. For example, the user may interact (e.g., select, modify, slice, dice, pivot, or otherwise) a particular measure, dimension, and/or view of the data cube.

In step 606, the semantic suggestions modules identify data contained in the data objects that is semantically related to the data interacted with by the user. For instance, in some embodiments, step 606 may include identifying metadata associated with the data interacted with by the user. The metadata may be contained in additional data objects, e.g., data objects not actively being viewed and/or managed in the contextual workspace. For example, metadata that is part of the data interacted with by the user may be searched for and matched to metadata in other data objects stored in a repository communicably coupled to the contextual workspace (e.g., in an in-memory database). In some aspects, step 606 may also include matching an identified metric of the data interacted with by the user to similar (or identical) metric(s) of data in the stored data objects.

In the case of the data objects being data cubes (e.g., OLAP cubes), step 606 may include searching the stored data cubes for another data cube having an identified metric of the particular data cube interacted with by the user. For example, step 606 may include querying the stored data cubes for at least one view, dimension, and/or measure of data that matches a corresponding view, dimension, and/or measure of data contained the interacted with workspace modules in the contextual workspace. As another example, step 606 may include searching the stored data cubes for at least one report utilizing the view of data that matches a view of data contained in at least one workspace module interacted with by the user.

In step 608, the semantic suggestions modules generate suggestions for the semantically-related data contained in the data objects. One or more of the generated suggestions may include a description of data contained in the data objects that is semantically related to the data interacted with by the user. For instance, once at least some semantically related (e.g., semantically relevant) data is identified in step 606, suggestions for each discrete portion of data (e.g., data cube, report, document, or other type of object that contains business data) may be generated and, in some cases, stored in a repository (e.g., the in-memory database 140, a local client memory, and/or a server memory). The description of data may be, for example, a description of the data object itself (e.g., name of data cube, name of report, etc.); a description of metadata in the data object; a description of a metric of the data object (e.g., a view, a measure, a dimension of a data cube, or a heading of a table, etc.).

In step 610, the semantic suggestions modules rank suggestions based on a calculated relevancy of each of the suggestions. For example, in some aspects, step 610 may include determining, for each data object identified in step 606, an occurrence frequency of at least one keyword from the metadata associated with the data interacted with by the user in the data contained in the identified data objects. Further, step 606 may also include determining an order of the identified data objects based on the determined occurrence frequencies. In some aspects, a data object among the identified data objects that has the highest occurrence frequency is at a top of the order of ranked suggestions. A data object among the identified data objects that has the lowest occurrence frequency is at a bottom of the order, and so on.

In step 612, the semantic suggestions modules provide at least one suggestion having a description of the semantically-related data to the user. The suggestion(s) may be provided in a variety of different manners, such as, for example, a pop-up workspace module in the contextual workspace, a feed stream within the contextual workspace, and/or an electronic communication to the user (e.g., via the contextual workspace, via an email, via a text message, or otherwise).

Method 600 may include other aspects as well. For instance, in some aspects, the identified semantically relevant data and/or suggestions (ranked or otherwise) may be stored (separately or otherwise). In some further aspects as described above, the searched data objects and/or suggestions for semantically relevant content may be stored in an in-memory database (e.g., the in-memory database 140), thereby allowing real-time searching and identification of the semantically relevant data and/or suggestions.

Figure 7:
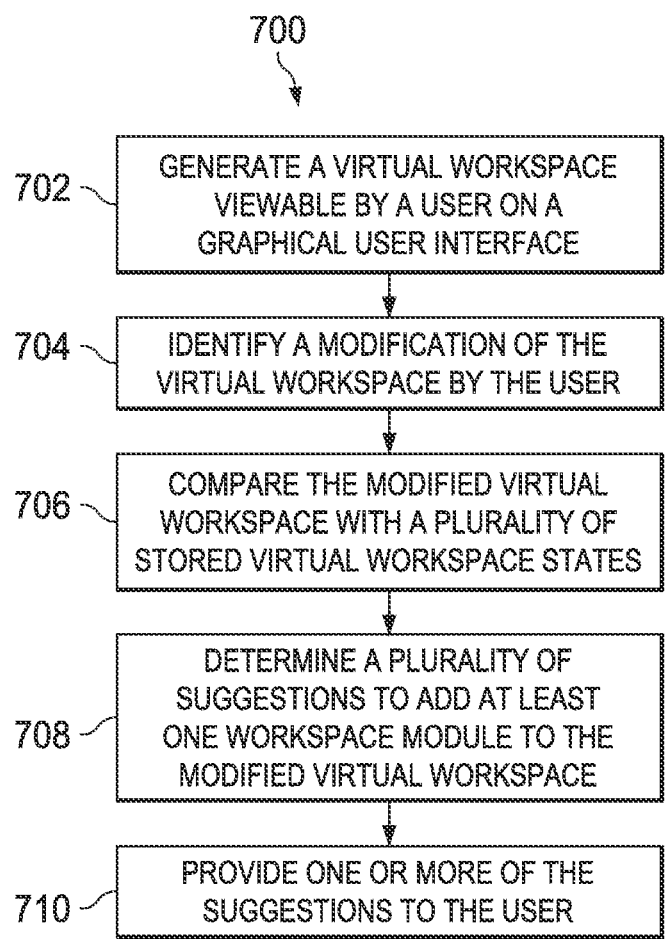
FIG. 7 illustrates another example method for using a contextual workspace according to the present disclosure.

FIG. 7 illustrates another example method 700 for using a contextual workspace. For example, in some embodiments, method 700, when implemented, may provide a suggestion to a user of the contextual workspace to add data to the contextual workspace of the user according to one or more social metrics. In some embodiments, method 700 may be performed on any of the illustrated computing environments of FIGS. 1, 2A, 2B, and 3, as well as other appropriate computing environments. Method 700 may be performed, at least in part, by the web client 302, the web server 340, the in-memory computing engine 356, and/or a combination thereof, e.g., by the suggestions and rankings module 334, the social suggestions module 360, and/or a combination thereof ("social suggestions modules"). Method 700 may begin at step 702, when the web client 302, the web server 340, and/or the in-memory computing engine 356 generate a virtual workspace viewable by a user on a graphical user interface. For example, in some embodiments, the virtual workspace may be one of the example contextual workspaces illustrated in FIGS. 4A-4C.

In step 704, the social suggestions modules identify a modification of the virtual workspace by the user. The modification may be, for example, an addition of a workspace module to the contextual workspace by the user. The modification may also be, for example, a deletion of a workspace module from the contextual workspace by the user. Turning to FIG. 8A, for example, graphical view 805 shows a user of a contextual workspace started with workspace module "M1" being added to the workspace, followed by workspace module "M2" and then "M3." In some aspects, each addition of a workspace module (e.g., M1, M2, and M3) may be identified.

In step 706, the social suggestions modules compare the modified virtual workspace with a plurality of stored virtual workspace states. For example, in some embodiments, step 706 may include identifying one or more stored virtual workspace states that include a particular workspace module on the modified contextual workspace (e.g., M2 and/or M3). The social suggestions modules may then determine one or more additional workspace modules within the identified stored virtual workspace states that is different from the particular workspace module. For instance, turning to FIG. 8A, graphical view 810 shows several stored workspace states 815 (e.g., based on other users' contextual workspaces at corresponding time instances). One stored workspace state 815 includes the workspace modules M1, M4, and M5. A second stored workspace state 815 includes the workspace modules M1, M7, and M9. A third stored workspace state 815 includes the workspace modules M2, M3, and M9. A fourth stored workspace state 815 includes the workspace modules M2, M5, and M6.

Step 706 may also include determining a number of occurrences of each of the one or more additional workspace modules in the identified stored virtual workspace states. For example, turning to FIG. 8A, graphical view 820 shows a tally of the number of occurrences of each of the additional workspace modules that are not in the contextual workspace of the user (e.g., M4, M5, M6, M7, M8, and M9). For example, workspace module M9 occurred three instances in other users' contextual workspaces that also included at least one workspace module in common with the modified contextual workspace of the user. As illustrated in graphical view 810, workspace module M9 occurred once in a contextual workspace with workspace module M1, once in a contextual workspace with workspace module M2, and once in a contextual workspace with workspace module M3, for a total of three occurrences.

In step 708, the social suggestions modules determine a plurality of suggestions to add at least one workspace module to the modified virtual workspace. In some aspects, this step may also include associating a ranking number with each of the additional workspace modules (e.g., M4, M5, M6, M7, M8, and M9) in the identified stored virtual workspace states (e.g., workspace states 815) based on the corresponding number of occurrences of each of the additional workspace modules. For instance, as illustrated in graphical view 820 of FIG. 8A, the additional workspace modules M4, M5, M6, M7, M8, and M9 are ranked according to the tally described above. The suggestions to the user may, therefore, be to add workspace module M9, followed by workspace module M5, and so on.

In some aspects, step 708 may also include identifying a primary user role of the user. For instance, as illustrated in graphical view 805 of FIG. 8B, a role 825 of the user is determined (e.g., from employee records or otherwise). Further, user roles associated with the stored virtual workspace states are determined. For instance, as illustrated in graphical view 810 of FIG. 8B, roles 830 of the users of the stored workspace states 815 are determined.

In some aspects, the ranking numbers of each of the additional workspace modules (e.g., M4, M5, M6, M7, M8, and M9) may be determined (or recalculated) according to the roles of the user(s). For instance, step 708 may also include determining a number of occurrences of each of the additional workspace modules within the stored virtual workspace states 815 with a user role 830 that matches the user role 825. Step 708 may also include incrementing the ranking number associated with each of the additional workspace modules in the stored virtual workspace states based on the corresponding number of occurrences of each of the additional workspace modules. For example, as shown in graphical view 835 of FIG. 8B, the workspace modules (e.g., M4, M5, M6, M7, M8, and M9) are re-ranked based on the determined roles. For example, as illustrated, the tally for workspace module M5 is increased by two based on this module being included in the stored workspace states 815 of two other sales persons in the business enterprise.

In some aspects, step 708 may also include determining a time duration between a modification of the stored virtual workspace state 815 associated with a workspace module of the user's contextual workspace (e.g., M1, M2, M3) and a modification of the stored virtual workspace state 815 associated with an additional workspace module (e.g., M4, M5, M6, M7, M8, or M9). For example, as shown in graphical view 840 in FIG. 8C, time durations are determined between, for example, M1 and M4, M1, and M5, etc. The time duration, in some aspects, represents the amount of time between the addition of a particular workspace module (e.g., M4) and the addition of an initial workspace module (e.g., M1) to the stored workspace state. In some aspects, for instance, a shorter time duration may represent a higher importance of the added workspace module.

Step 708 may also include determining a corresponding weighted value for the additional workspace module based on the determined time durations. For instance, as shown in graphical views 840 and 845, time duration ranges may be associated with weighted values to, for example, represent a relative importance or relevance of each of the workspace modules in the stored workspace states 815. For example, a time duration less than about 1 day (e.g., an amount of time after one workspace module was added that another workspace module was added (or deleted or otherwise modified)) may be weighted 2. A time duration between about 1 day and 5 days may be weighted 1. A time duration greater than 5 days may be weighted 0 (i.e., no relative importance).

Figure 8B:
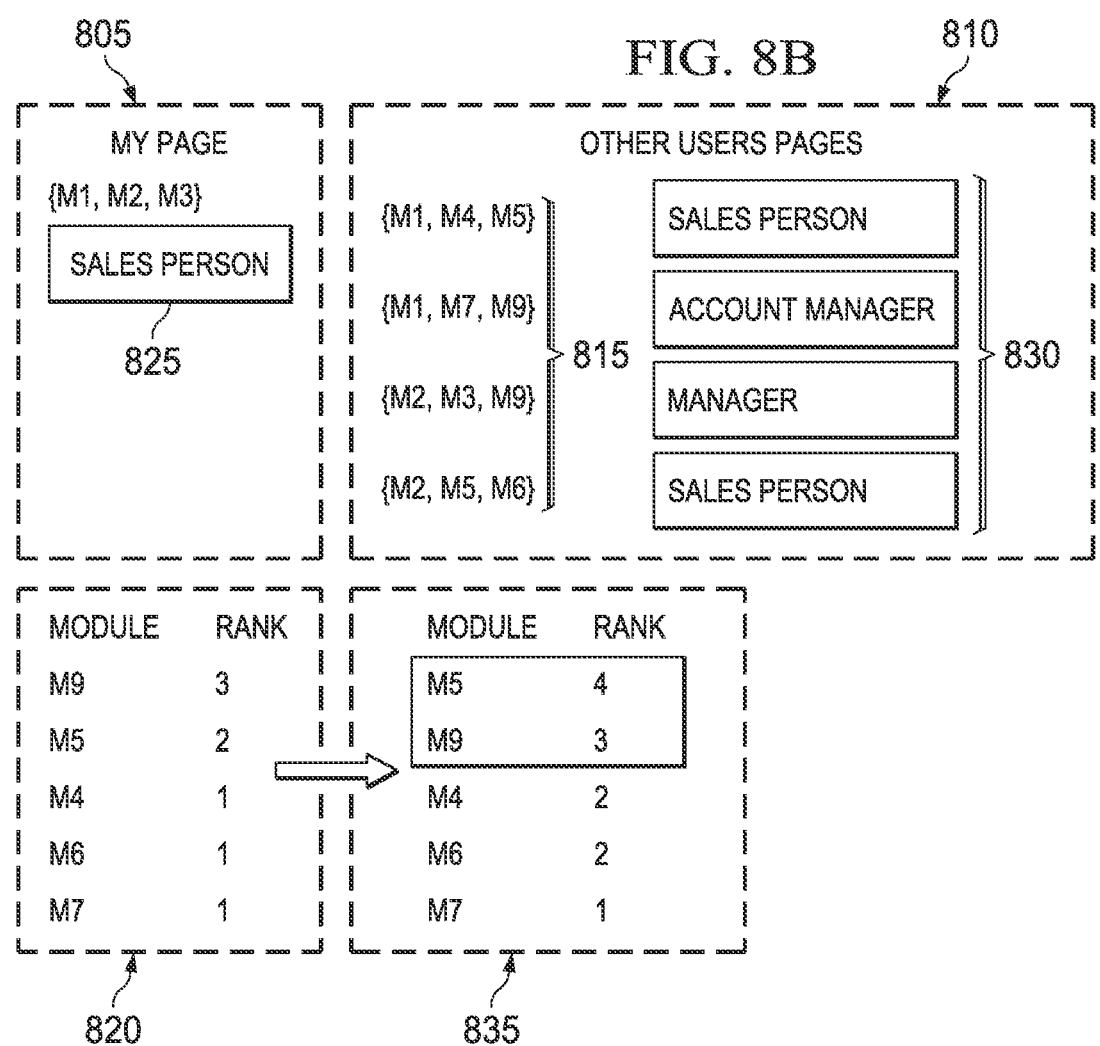

Based on the weighted values assigned to each additional workspace module (e.g., M4, M5, M6, M7, M8, and M9) of the stored workspace states 815, step 708 may also include incrementing the ranking number associated with the additional workspace modules in the stored virtual workspace states 815. For example, as shown in graphical view 845 in FIG. 8C, the tallies of the additional workspace modules may be increased by the weighted values corresponding to the determined time durations. While graphical view 845 in FIG. 8C shows a change in tallies relative to graphical view 820 in FIG. 8A, the tallies may also be incremented (alternatively) based on the tallies shown in graphical view 820 in FIG. 8B.

In step 710, the social suggestions modules provide one or more of the suggestions to the user, e.g., based on the ranked suggestions.

Method 700 may include other aspects as well. For instance, in some aspects, the identified semantically relevant data and/or suggestions (ranked or otherwise) may be stored (separately or otherwise). In some further aspects as described above, the searched data objects and/or suggestions for semantically relevant content may be stored in an in-memory database (e.g., the in-memory database 140), thereby allowing real-time searching and identification of the semantically relevant data and/or suggestions.

Figure 9:
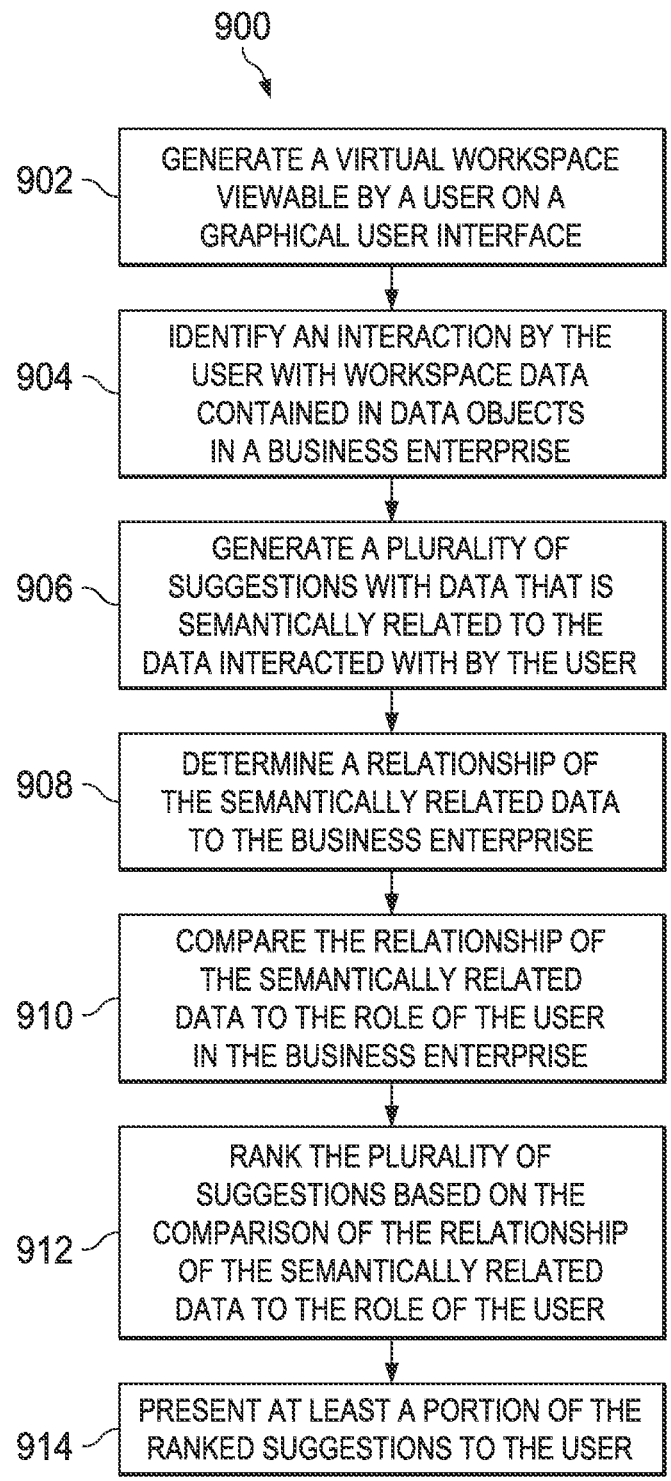
FIG. 9 illustrates another example method for using a contextual workspace according to the present disclosure.

FIG. 9 illustrates another example method 900 for using a contextual workspace. For example, in some embodiments, method 900, when implemented, may provide one or more suggestions to a user of the contextual workspace to add semantically related information to the contextual workspace that are ranked according to one or more social metrics. In some embodiments, method 900 may be performed on any of the illustrated computing environments of FIGS. 1, 2A, 2B, and 3, as well as other appropriate computing environments. Method 900 may be performed, at least in part, by the web client 302, the web server 340, the in-memory computing engine 356, and/or a combination thereof, e.g., by the suggestions and rankings module 334, the semantic suggestions module 360, the social suggestions module, other components, and/or a combination thereof ("rankings modules"). Method 900 may begin at step 902, when the web client 302, the web server 340, and/or the in-memory computing engine 356 generate a virtual workspace viewable by a user on a graphical user interface. For example, in some embodiments, the virtual workspace may be one of the example contextual workspaces illustrated in FIGS. 4A-4C.

In step 904, the rankings modules identify an interaction by the user with workspace data contained in data objects in a business enterprise. The interaction by the user may be a variety of different interactions. For instance, the interaction may be an identification of a workspace module added to the virtual contextual workspace by the user. The interaction may also be an identification of a selection of a workspace module among several workspace modules on the user's contextual workspace. As another example, the interaction may be an identification of a selection of data contained in the particular data object by the user, such as, for example, a selection of text in a document, a selection of a heading in a table, and/or a selection of an axis or data point in a graph. As yet another example, the interaction may be an identification of a metric of a particular data object in a workspace module among several metrics.

In some embodiments, one or more data objects viewable and/or manageable within the workspace modules in the contextual workspace may be data cubes. In such embodiments, the interaction by the user may be an interaction with at least some of the data contained in a particular data cube of the data cubes exposed in one or more workspace modules within the contextual workspace. For example, the user may interact (e.g., select, modify, slice, dice, pivot, or otherwise) a particular measure, dimension, and/or view of the data cube.

In some aspects, step 904 may also include identifying data contained in one or more data objects that is semantically related to the data interacted with by the user. For instance, in some embodiments, step 904 may include identifying metadata associated with the data interacted with by the user. The metadata may be contained in additional data objects, e.g., data objects not actively being viewed and/or managed in the contextual workspace. For example, metadata that is part of the data interacted with by the user may be searched for and matched to metadata in other data objects stored in a repository communicably coupled to the contextual workspace (e.g., in an in-memory database). In some aspects, step 904 may also include matching an identified metric of the data interacted with by the user to similar (or identical) metric(s) of data in the stored data objects.

In the case of the data objects being data cubes (e.g., OLAP cubes), step 904 may include searching the stored data cubes for another data cube having an identified metric of the particular data cube interacted with by the user. For example, step 904 may include querying the stored data cubes for at least one view, dimension, and/or measure of data that matches a corresponding view, dimension, and/or measure of data contained the interacted with workspace modules in the contextual workspace. As another example, step 904 may include searching the stored data cubes for at least one report utilizing the view of data that matches a view of data contained in at least one workspace module interacted with by the user.

In step 906, the rankings modules generate a plurality of suggestions with data that is semantically related to the data interacted with by the user. One or more of the generated suggestions may include a description of data contained in the data objects that is semantically related to the data interacted with by the user. For instance, once at least some semantically related (e.g., semantically relevant) data is identified in step 904, suggestions for each discrete portion of data (e.g., data cube, report, document, or other type of object that contains business data) may be generated and, in some cases, stored in a repository (e.g., the in-memory database 140, a local client memory, and/or a server memory). The description of data may be, for example, a description of the data object itself (e.g., name of data cube, name of report, etc.); a description of metadata in the data object; description of a metric of the data object (e.g., a view, a measure, a dimension of a data cube, or a heading of a table, etc.).

In step 908, the rankings modules determine a relationship of the semantically related data to the business enterprise. In some aspects, step 908 may include determining a role of an employee in the business enterprise that has used a particular portion of the semantically related data. Step 908 may also include, in some embodiments, determining the role based on, for instance, the user's identification within his/her business enterprise as determined in the enterprise's corporate human resource (HR) system(s). Determining the role may also include dynamically determining a business network relationship of the user within the enterprise based on, for instance, participation in particular projects, having particular expertise, participation in the particular working groups, and other business interactions. For example, in some cases, other business users, i.e., other employees of a business enterprise have used (e.g., viewed, manipulated, or otherwise) the data that is semantically related to the interacted with data in the user's contextual workspace. Step 908 may also include determining a business unit of the business enterprise related to a particular portion of the semantically related data. For instance, the semantically related data may have a particular relationship with an organizational unit (e.g., a team, a business group, a division, a company, a subsidiary, or otherwise) of the business enterprise. For instance, the semantically related data may be associated with a particular product and/or service offered by a subsidiary of the business enterprise.

In step 910, the rankings modules compare the relationship of the semantically related data to the role of the user in the business enterprise. In some aspects, the rankings modules may compare the role of the user (e.g., a position within the business enterprise) interacting with the contextual workspace with the role of the employee in the business enterprise that has used the portion of the semantically related data. If the role of the user and the role of the employee match, for example, a rank of a suggestion describing the semantically related data may be increased (i.e., moved higher in importance on a scale of ranked suggestions). Further, if the role of the user and the role of the employee do not match but are similar (e.g., within adjacent levels of seniority of the same position), the rank of the suggestion describing the semantically related data may also be increased, but to a lesser degree.

As another example, the rankings modules may compare the role of the user (as determined above) with the business unit of the business enterprise related to a particular portion of the semantically related data. For example, the role of the user interacting with data in the contextual workspace may fit within the business unit of the enterprise, e.g., be part of a group, team, or other unit within the particular organizational structure of the enterprise, be working on a particular project or job, or have the same or similar expertise as other users in the business unit. If the role of the user fits within the business unit, a rank of a suggestion describing the semantically related data may be increased (i.e., moved higher in importance on a scale of ranked suggestions).

In step 912, the rankings modules rank the plurality of suggestions based on the comparison of the relationship of the semantically related data to the role of the user. For example, certain suggestions describing semantically related data may be ranked higher due to a social position of the user within the business enterprise. For example, suggestions for semantically related data that has been viewed, modified, and/or used by other employees within the business enterprise having the same (or similar) role may be ranked higher than, for instance, suggestions for semantically related data that has been viewed, modified, and/or used by other employees within the business enterprise having different roles than the user. Further, suggestions for semantically related data that is related to the user's organizational unit within the business enterprise (e.g., the same group, team, division, etc.) may be ranked higher than, for instance, suggestions for semantically related data that is related to an organizational unit within the business enterprise different than the user's. As another example, suggestions for semantically related data may be based on, for instance, dynamically determined business network relationships of the user (e.g., within the entire enterprise, the same group, team, division, etc.). In step 914, the rankings modules present at least a portion of the ranked suggestions to the user.

Method 900 may include other aspects as well. For instance, in some aspects, the identified semantically relevant data and/or ranked suggestions may be stored (separately or otherwise). In some further aspects as described above, the searched data objects and/or suggestions for semantically relevant content may be stored in an in-memory database (e.g., the in-memory database 140), thereby allowing real-time searching and identification of the semantically relevant data and/or ranked suggestions.

A number of implementations have been described. Nevertheless, it will be understood that various modifications may be made. For example, other methods described herein besides those or in addition to those illustrated in FIGS. 5-7 and 9 may be performed. Further, the illustrated steps of methods 500, 600, 700, and 900 may be performed in different orders, either concurrently or serially. Further, steps may be performed in addition to those illustrated in methods 500, 600, 700, and 900, and some steps illustrated in methods 500, 600, 700, and 900 may be omitted without deviating from the present disclosure. Accordingly, other implementations are within the scope of the following claims.

What is claimed is:

1. A method performed with a computing system for managing a virtual workspace, the method comprising:
    generating an initial virtual workspace viewable by a user on a graphical user interface, the initial virtual workspace comprising a plurality of workspace modules comprising data contained in a plurality of data objects, the initial virtual workspace associated with i) a first view of the plurality of workspace modules and ii) a first timestamp;
    identifying an interaction by the user with at least some of the data contained in a particular data object of the plurality of data objects;
    providing, through the initial virtual workspace, at least one suggestion comprising a description of data contained in the plurality of data objects that is semantically related to the data interacted with by the user;
    modifying, based on the suggestion, the initial virtual workspace to include an additional workspace module comprising data contained in the plurality of data objects, the modified virtual workspace associated with i) a second view of the plurality of workspace modules and the additional workspace module and ii) a second timestamp;
    filtering the first and second views based on i) a user-selected timestamp of the first and the second timestamps and ii) user-selected data of the data contained in the plurality of data objects of the initial workspace and the modified virtual workspace;
    based on the filtering, retrieving at least one of the first and second views that corresponds to both the user-selected timestamp and the user-selected data to provide a retrieved view of the virtual workspace; and
    preparing the retrieved view of the virtual workspace for display.

2. The method of claim 1, further comprising receiving the suggestion from a content provider communicably coupled to the initial virtual workspace.

3. The method of claim 1, wherein identifying an interaction by the user with at least some of the data contained in the plurality of data objects comprises at least one of:
    identifying a workspace module added to the virtual initial workspace by the user;
    identifying a selection of a workspace module in the plurality of workspace modules;
    identifying a selection of the data contained in the particular data object; or
    identifying a metric of the particular data object among a plurality of metrics.

4. The method of claim 1, further comprising:
    identifying metadata associated with the data interacted with by the user; and
    identifying the data contained in the plurality of data objects that is semantically related to the data interacted with by the user based on the identified metadata.

5. The method of claim 4, further comprising:
    generating a plurality of suggestions, each suggestion comprising a description of data contained in the plurality of data objects that is semantically related to the data interacted with by the user; and
    ranking the plurality of identified suggestions based on a calculated relevancy of each of the plurality of identified suggestions.

6. The method of claim 5, wherein ranking the plurality of identified suggestions based on a calculated relevancy of each of the plurality of identified suggestions comprises:
    determining, for each data object, an occurrence frequency of at least one keyword from the metadata associated with the data interacted with by the user in the data contained in the plurality of data objects; and
    determining an order of the data objects based on the determined occurrence frequencies, wherein a data object having the highest occurrence frequency is at a top of the order and a data object having a lowest occurrence frequency is at a bottom of the order.

7. The method of claim 1, wherein the plurality of data objects comprise a first data object and a second data object, the method further comprising:
    identifying at least one metric of the first data object;
    matching the identified metric to a metric of the second data object; and
    generating the suggestion comprising a description of data contained in the second data object.

8. The method of claim 1, wherein the plurality of data objects comprise a plurality of data cubes, and wherein identifying an interaction by the user with at least some of the data contained in a particular data object of the plurality of data objects comprises identifying an interaction by the user with at least some of the data contained in a particular data cube of the plurality of data cubes.

9. The method of claim 8, further comprising:
    identifying at least one metric of the particular data cube interacted with by the user;
    searching the plurality of data cubes for another data cube having the identified metric of the particular data cube interacted with by the user; and
    generating the suggestion comprising a description of data contained in the other data cube.

10. The method of claim 9, further comprising:
    querying the other data cube for at least one view of data contained in the other data cube that matches a view of data contained in at least one workspace module in the initial virtual workspace viewable in the graphical user interface; and
    generating the suggestion comprising a description of the view of data contained in the other data cube.

11. The method of claim 10, further comprising:
    searching the plurality of data cubes for at least one report utilizing the view of data contained in the other data cube that matches a view of data contained in at least one workspace module; and
    generating the suggestion comprising a description of the report utilizing the view of data contained in the other data cube.

12. An apparatus comprising instructions embodied on a tangible, non-transitory computer-readable media, the instructions operable when executed to cause a computing system to perform operations comprising:

generating an initial virtual workspace viewable by a user on a graphical user interface, the initial virtual workspace comprising a plurality of workspace modules comprising data contained in a plurality of data objects, the initial virtual workspace associated with i) a first view of the plurality of workspace modules and ii) a first timestamp;

identifying an interaction by the user with at least some of the data contained in a particular data object of the plurality of data objects;

providing, through the initial virtual workspace, at least one suggestion comprising a description of data contained in the plurality of data objects that is semantically related to the data interacted with by the user;

modifying, based on the suggestion, the initial virtual workspace to include an additional workspace module comprising data contained in the plurality of data objects, the modified virtual workspace associated with i) a second view of the plurality of workspace modules and the additional workspace module and ii) a second timestamp;

filtering the first and second views based on i) a user-selected timestamp of the first and the second timestamps and ii) user-selected data of the data contained in the plurality of data objects of the initial workspace and the modified virtual workspace;

based on the filtering, retrieving at least one of the first and second views that corresponds to both the user-selected timestamp and the user-selected data to provide a retrieved view of the virtual workspace; and preparing the retrieved view of the virtual workspace for display.

13. The apparatus of claim 12, wherein the operations further comprise receiving the suggestion from a content provider communicably coupled to the initial virtual workspace.

14. The apparatus of claim 12, wherein identifying an interaction by the user with at least some of the data contained in the plurality of data objects comprises at least one of:
   identifying a workspace module added to the initial virtual workspace by the user;
   identifying a selection of a workspace module in the plurality of workspace modules;
   identifying a selection of the data contained in the particular data object; or
   identifying a metric of the particular data object among a plurality of metrics.

15. The apparatus of claim 12, wherein the operations further comprise:
   identifying metadata associated with the data interacted with by the user; and
   identifying the data contained in the plurality of data objects that is semantically related to the data interacted with by the user based on the identified metadata.

16. The apparatus of claim 15, wherein the operations further comprise:
   generating a plurality of suggestions, each suggestion comprising a description of data contained in the plurality of data objects that is semantically related to the data interacted with by the user; and
   ranking the plurality of identified suggestions based on a calculated relevancy of each of the plurality of identified suggestions.

17. The apparatus of claim 16, wherein ranking the plurality of identified suggestions based on a calculated relevancy of each of the plurality of identified suggestions comprises:

determining, for each data object, an occurrence frequency of at least one keyword from the metadata associated with the data interacted with by the user in the data contained in the plurality of data objects; and determining an order of the data objects based on the determined occurrence frequencies, wherein a data object having the highest occurrence frequency is at a top of the order and a data object having a lowest occurrence frequency is at a bottom of the order.

18. The apparatus of claim 12, wherein the plurality of data objects comprise a first data object and a second data object, and wherein the operations further comprise:
   identifying at least one metric of the first data object;
   matching the identified metric to a metric of the second data object; and
   generating the suggestion comprising a description of data contained in the second data object.

19. The apparatus of claim 12, wherein the plurality of data objects comprise a plurality of data cubes, and wherein identifying an interaction by the user with at least some of the data contained in a particular data object of the plurality of data objects comprises identifying an interaction by the user with at least some of the data contained in a particular data cube of the plurality of data cubes.

20. The apparatus of claim 19, wherein the operations further comprise:
   identifying at least one metric of the particular data cube interacted with by the user;
   searching the plurality of data cubes for another data cube having the identified metric of the particular data cube interacted with by the user; and
   generating the suggestion comprising a description of data contained in the other data cube.

21. The apparatus of claim 20, wherein the operations further comprise:
   querying the other data cube for at least one view of data contained in the other data cube that matches a view of data contained in at least one workspace module in the initial virtual workspace viewable in the graphical user interface; and
   generating the suggestion comprising a description of the view of data contained in the other data cube.

22. The apparatus of claim 21, wherein the operations further comprise:
   searching the plurality of data cubes for at least one report utilizing the view of data contained in the other data cube that matches a view of data contained in at least one workspace module; and
   generating the suggestion comprising a description of the report utilizing the view of data contained in the other data cube.

23. A computing system, comprising
   one or more memory modules;
   one or more processors;
   a graphical user interface; and
   a contextual services module stored on one or more of the memory modules, the contextual services module operable when executed with the one or more processors to perform operations comprising:
      generating an initial virtual workspace viewable on a graphical user interface, the initial virtual workspace comprising a plurality of workspace modules comprising data contained in a plurality of data objects, the initial virtual workspace associated with i) a first view of the plurality of workspace modules and ii) a first timestamp;

identifying an interaction by a user of the virtual workspace with at least some of the data contained in a particular data object of the plurality of data objects;

providing, through the initial virtual workspace, at least one suggestion comprising a description of data contained in the plurality of data objects that is semantically related to the data interacted with by the user;

modifying, based on the suggestion, the initial virtual workspace to include an additional workspace module comprising data contained in the plurality of data objects, the modified virtual workspace associated with i) a second view of the plurality of workspace modules and the additional workspace module and ii) a second timestamp;

filtering the first and second views based on i) a user-selected timestamp of the first and the second timestamps and ii) user-selected data of the data contained in the plurality of data objects of the initial workspace and the modified virtual workspace; and based on the filtering, retrieving at least one of the first and second views that corresponds to both the user-selected timestamp and the user-selected data to provide a retrieved view of the virtual workspace; and preparing the retrieved view of the virtual workspace for display.

24. The system of claim 23, wherein the operations further comprise receiving the suggestion from a content provider communicably coupled to the initial virtual workspace.

25. The system of claim 23, wherein identifying an interaction by the user with at least some of the data contained in the plurality of data objects comprises at least one of:

identifying a workspace module added to the initial virtual workspace by the user;

identifying a selection of a workspace module in the plurality of workspace modules;

identifying a selection of the data contained in the particular data object; or identifying a metric of the particular data object among a plurality of metrics.

26. The system of claim 23, wherein the operations further comprise:

identifying metadata associated with the data interacted with by the user; and identifying the data contained in the plurality of data objects that is semantically related to the data interacted with by the user based on the identified metadata.

27. The system of claim 26, wherein the operations further comprise:

generating a plurality of suggestions, each suggestion comprising a description of data contained in the plurality of data objects that is semantically related to the data interacted with by the user; and ranking the plurality of identified suggestions based on a calculated relevancy of each of the plurality of identified suggestions.

28. The system of claim 27, wherein ranking the plurality of identified suggestions based on a calculated relevancy of each of the plurality of identified suggestions comprises:

determining, for each data object, an occurrence frequency of at least one keyword from the metadata associated with the data interacted with by the user in the data contained in the plurality of data objects; and determining an order of the data objects based on the determined occurrence frequencies, wherein a data object having the highest occurrence frequency is at a top of the order and a data object having a lowest occurrence frequency is at a bottom of the order.

29. The system of claim 23, wherein the plurality of data objects comprise a first data object and a second data object, and wherein the operations further comprise:

identifying at least one metric of the first data object;

matching the identified metric to a metric of the second data object; and generating the suggestion comprising a description of data contained in the second data object.

30. The system of claim 23, wherein the plurality of data objects comprise a plurality of data cubes, and wherein identifying an interaction by the user with at least some of the data contained in a particular data object of the plurality of data objects comprises identifying an interaction by the user with at least some of the data contained in a particular data cube of the plurality of data cubes.

31. The system of claim 30, wherein the operations further comprise:

identifying at least one metric of the particular data cube interacted with by the user;

searching the plurality of data cubes for another data cube having the identified metric of the particular data cube interacted with by the user; and generating the suggestion comprising a description of data contained in the other data cube.

32. The system of claim 31, wherein the operations further comprise:

querying the other data cube for at least one view of data contained in the other data cube that matches a view of data contained in at least one workspace module in the initial virtual workspace viewable in the graphical user interface; and generating the suggestion comprising a description of the view of data contained in the other data cube.

33. The system of claim 32, wherein the operations further comprise:

searching the plurality of data cubes for at least one report utilizing the view of data contained in the other data cube that matches a view of data contained in at least one workspace module; and generating the suggestion comprising a description of the report utilizing the view of data contained in the other data cube.

* * * * *